United States Patent
Kim et al.

(10) Patent No.: US 12,422,897 B2
(45) Date of Patent: Sep. 23, 2025

(54) LIFTING STRUCTURE AND ELECTRONIC DEVICE INCLUDING THE SAME

(71) Applicant: Samsung Electronics Co., Ltd., Gyeonggi-do (KR)

(72) Inventors: Minji Kim, Gyeonggi-do (KR); Iksang Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 277 days.

(21) Appl. No.: 18/116,535

(22) Filed: Mar. 2, 2023

(65) Prior Publication Data
US 2023/0205280 A1  Jun. 29, 2023

Related U.S. Application Data

(63) Continuation of application No. PCT/KR2022/018369, filed on Nov. 21, 2022.

(30) Foreign Application Priority Data

Dec. 13, 2021  (KR) .......................... 10-2021-0177513
Apr. 5, 2022  (KR) .......................... 10-2022-0042370

(51) Int. Cl.
*G06F 1/16* (2006.01)
*E05D 3/12* (2006.01)
(Continued)

(52) U.S. Cl.
CPC ............ *G06F 1/1681* (2013.01); *F16C 11/04* (2013.01); *F16H 37/126* (2013.01); *G06F 1/1616* (2013.01); *E05D 3/122* (2013.01); *E05D 11/00* (2013.01); *E05Y 2201/604* (2013.01); *E05Y 2999/00* (2024.05)

(58) Field of Classification Search
CPC .... G06F 1/1681; G06F 1/1616; F16H 37/126; E05D 3/122; E05D 11/00; F16C 11/04; E05Y 2999/00
See application file for complete search history.

(56) References Cited

U.S. PATENT DOCUMENTS 8,693,175  B2   4/2014  Lee
2013/0077216  A1   3/2013  Lee
(Continued)

FOREIGN PATENT DOCUMENTS

JP  2004-287608  10/2004
JP  4375430  12/2009
(Continued)

OTHER PUBLICATIONS

International Search Report dated Feb. 23, 2023 issued in counterpart application No. PCT/KR2022/018369, 3 pages.

*Primary Examiner* — Allen L Parker
*Assistant Examiner* — Peter Krim
(74) *Attorney, Agent, or Firm* — The Farrell Law Firm, P.C.

(57) ABSTRACT

Provided is an electronic device including a first housing, a second housing, and a lifting structure that includes a fixing body, a gear assembly including at least one connecting gear and a driven gear operably connected to the at least one connecting gear, in which the at least one connecting gear is connected to the fixing body, a first moving body including a guide gear and a guide rail, and a second moving body including an engaging portion.

13 Claims, 24 Drawing Sheets

(51) Int. Cl.
*E05D 11/00* (2006.01)
*F16C 11/04* (2006.01)
*F16H 37/12* (2006.01)

(56) References Cited

U.S. PATENT DOCUMENTS

| | | | | |
|---|---|---|---|---|
| 2019/0317552 A1* | 10/2019 | Cheng | .................... | G06F 1/166 |
| 2020/0117245 A1 | 4/2020 | Ou et al. | | |
| 2020/0142456 A1* | 5/2020 | Hsu | ........................ | G06F 1/203 |
| 2020/0183451 A1* | 6/2020 | Lin | ........................ | G06F 1/1666 |
| 2021/0089077 A1* | 3/2021 | Wang | .................... | G06F 1/3287 |
| 2022/0171439 A1* | 6/2022 | Lin | ........................ | G06F 1/1681 |

FOREIGN PATENT DOCUMENTS

| | | |
|---|---|---|
| JP | 2011-187034 | 9/2011 |
| JP | 5677402 | 2/2015 |
| KR | 10-1360364 | 2/2014 |
| KR | 10-1747535 | 6/2017 |
| KR | 10-2335698 | 12/2021 |

\* cited by examiner

LIFTING STRUCTURE AND ELECTRONIC DEVICE INCLUDING THE SAME

CROSS-REFERENCE TO RELATED APPLICATION(S)

This application is a continuation of International Application No. PCT/KR2022/018369 designating the United States, filed on Nov. 21, 2022, and claims priority to Korean Patent Application Nos. 10-2021-0177513 and 10-2022-0042370, which were filed in the Korean Intellectual Property Office on Dec. 13, 2021, and Apr. 5, 2022, respectively, the entire disclosure of each which is incorporated herein by reference.

BACKGROUND

1. Field

The disclosure relates generally to a lifting structure and, more particularly, to an electronic device including the lifting structure.

2. Description of Related Art

In recent years, laptops and portable computers have continued to evolve to be smaller and more compact in size, and typically include a keyboard that is adjacent to a display, for data entry. However, such smaller size laptops and portable computers do not position the keyboard at an optimum angle that automatically adjusts based on opening of the laptop or portable computer.

A portable electronic device including a support structure for supporting a main body of which the bottom surface is inclined to the ground has been developed. For example, the support structure may support the main body by protruding from the bottom surface of the main body.

SUMMARY

The disclosure has been made to address at least the above-mentioned problems and/or disadvantages and to provide at least the advantages described below.

An aspect of the disclosure provides an electronic device that includes a first housing, a second housing including a display, and a lifting structure configured to connect the first housing to the second housing, and to lift the first housing based on rotation of the second housing. The lifting structure includes a fixing body connected to the second housing, a gear assembly including at least one connecting gear and a driven gear, with the driven gear operably connected to the at least one connecting gear, and the at least one connecting gear being connected to the fixing body, a first moving body configured to move, in the first housing, in a first direction, with the first moving body including a guide gear and a first guide rail formed in the first moving body, in a second direction intersecting with the first direction, with the guide gear being formed on the first moving body and the guide gear extending in the first direction and being configured to be driven by the driven gear, and a second moving body moveably coupled with the first housing and comprising an engaging portion configured to engage with the first guide rail, wherein the second moving body is configured to move in a third direction intersecting with the first direction and the second direction, and with the second body being configured to support the first housing.

An aspect of the disclosure provides a lifting structure that includes a fixing body, a gear assembly including at least one connecting gear and a driven gear, with the driven gear being operably connected to the at least one connecting gear, and the at least one connecting gear is connected to the fixing body, a first moving body configured to move in a first direction, with the first moving body including a guide gear and a first guide rail formed in the first moving body, in a second direction intersecting with the first direction, with the guide gear being formed on the first moving body, and with the guide gear extending in the first direction and being configured to be driven by the driven gear, and a second moving body including an engaging portion configured to engage with the guide rail, with the second moving body being configured to move in a third direction intersecting with the first direction and the second direction.

An aspect of the disclosure provides a method of operating an electronic device that includes a lifting structure, a first housing and a second housing that includes a display, with the method including rotating the second housing relative to the first housing and, based on the rotation of the second housing relative to the first housing, operating the lifting structure to raise the first housing above a surface on which the electronic device is placed. The lifting structure is configured to connect the first housing to the second housing, and the lifting structure includes a fixing body connected to the second housing, a gear assembly comprising at least one connecting gear and a driven gear, with the driven gear being operably connected to the at least one connecting gear, and the at least one connecting gear being connected to the fixing body, a first moving body configured to move, in the first housing, in a first direction, with the first moving body including a guide gear and a first guide rail formed in the first moving body, in a second direction intersecting with the first direction, with the guide gear being formed on the first moving body, and with the guide gear extending in the first direction and being configured to be driven by the driven gear, and a second moving body moveably coupled with the first housing and including an engaging portion configured to engage with the first guide rail, with the second moving body being configured to move in a third direction intersecting with the first direction and the second direction, and with the second moving body being configured to support the first housing.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
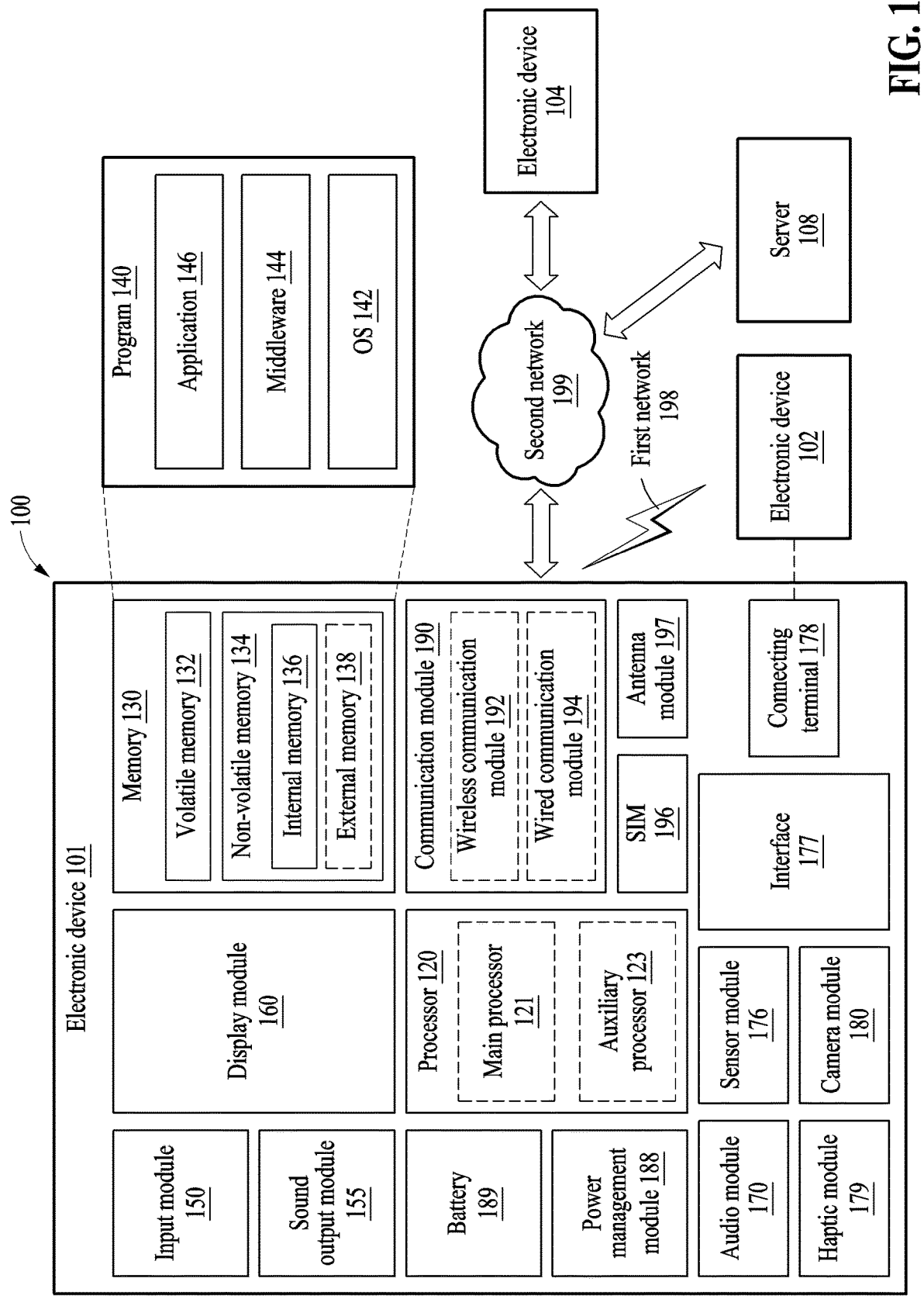
FIG. 1 is a block diagram illustrating an electronic device in a network environment according to an embodiment.

Hereinafter, embodiments will be described in detail with reference to the accompanying drawings, with like reference numerals referring to like elements. For conciseness, repeated descriptions are omitted.

FIG. 1 is a block diagram illustrating an electronic device 101 in a network environment 100. Referring to FIG. 1, the electronic device 101 in the network environment 100 may communicate with an electronic device 102 via a first network 198 (e.g., a short-range wireless communication network), or communicate with at least one of an electronic device 104 and a server 108 via a second network 199 (e.g., a long-range wireless communication network). The electronic device 101 may communicate with the electronic device 104 via the server 108. The electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In certain embodiments, at least one of the components (e.g., the connecting terminal 178) may be omitted from the electronic device 101, or one or more other components may be added to the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computations. As at least a part of data processing or computations, the processor 120 may store a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from or in conjunction with the main processor 121. For example, when the electronic device 101 includes the main processor 121 and the auxiliary processor 123, the auxiliary processor 123 may be adapted to consume less power than the main processor 121 or the auxiliary processor 123 may operate based on a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). The auxiliary processor 123 (e.g., an ISP or a CP) may be implemented as a portion of another component (e.g., the camera module 180 or the communication module 190) that is functionally related to the auxiliary processor 123. The auxiliary processor 123 (e.g., an NPU) may include a hardware structure specifically for artificial intelligence (AI) model processing. An AI model may be generated by machine learning. The machine learning may be performed by, for example, the electronic device 101, in which AI is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive, from outside (e.g., from a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. The receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control its corresponding one of the display, the hologram device, and the projector. The display module 160 may include a touch sensor adapted to detect a touch, or a pressure sensor adapted to measure the intensity of force of the touch.

The audio module 170 may convert sound into an electric signal or vice versa. The audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with the external electronic device (e.g., the electronic device 102) directly (e.g., by wire) or wirelessly. The interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). The connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. The haptic module 179 may include, for example, a motor, a piezoelectric element, or an electric stimulator.

The camera module 180 may capture a still image and moving images. The camera module 180 may include one or more lenses, image sensors, ISPs, and flashes.

The power management module 188 may manage power supplied to the electronic device 101. The power management module 188 may be implemented as, for example, at least a part of a power management integrated circuit (PMIC).

The battery 189 may supply power to at least one component of the electronic device 101. The battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mm Wave band) to achieve, e.g., a high data transmission rate.

The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. Another component (e.g., a radio frequency integrated circuit (RFIC)) other than the radiating element may be additionally formed as a part of the antenna module 197.

The antenna module 197 may form a mmWave antenna module. The mm Wave antenna module may include a PCB, an RFIC on a first surface (e.g., the bottom surface) of the PCB, or adjacent to the first surface of the PCB and capable of supporting a designated high-frequency band (e.g., a mmWave band), and a plurality of antennas (e.g., array antennas) disposed on a second surface (e.g., the top or a side surface) of the PCB, or adjacent to the second surface of the PCB and capable of transmitting or receiving signals of the designated high-frequency band.

At least some of the above-described components may be mutually coupled and exchange signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device (e.g., the electronic device 104) via the server 108 coupled with the second network 199. Each of the external electronic devices (e.g., the electronic device 102 or 104) may be a device of the same type as or a different type from the electronic device 101. All or some of operations to be executed by the electronic device 101 may be executed by one or more external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or service. The one or more external electronic devices receiving the request may perform the at least part of the function or service, or an additional function or an additional service related to the request and may transfer a result of the performance to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or MEC. The external electronic device (e.g., the electronic device 104) may include an Internet-of-things (IoT) device. The server 108 may be an intelligent server using machine learning and/or a neural network. The external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

The electronic device may be one of various types of electronic devices. The electronic device may include, for example, a portable communication device (e.g., a smartphone), a computer device, a portable multimedia device, a portable medical device, a camera, a wearable device, or a home appliance device, without being so limited.

The terms used therein are not intended to limit the technological features set forth herein to particular embodiments and include various changes, equivalents, or replacements for a corresponding embodiment. It is to be understood that a singular form of a noun corresponding to an item may include one or more of the things unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

The term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

The memory 130 may be implemented as software (e.g., the program 140) including one or more instructions that are stored in a storage medium (e.g., the internal memory 136 or the external memory 138) that is readable by a machine (e.g., the electronic device 101). For example, a processor of the machine may invoke at least one of the one or more instructions stored in the storage medium and execute the one or more instructions. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" means that the storage medium is a tangible device, and does not include a signal (e.g., an electromagnetic wave), but this term does not differentiate between where data is semi-permanently stored in the storage medium and where the data is temporarily stored in the storage medium.

A method may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

Each component (e.g., a module or a program) of the above-described components may include a single entity or multiple entities, and some of the multiple entities may be separately disposed in different components. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
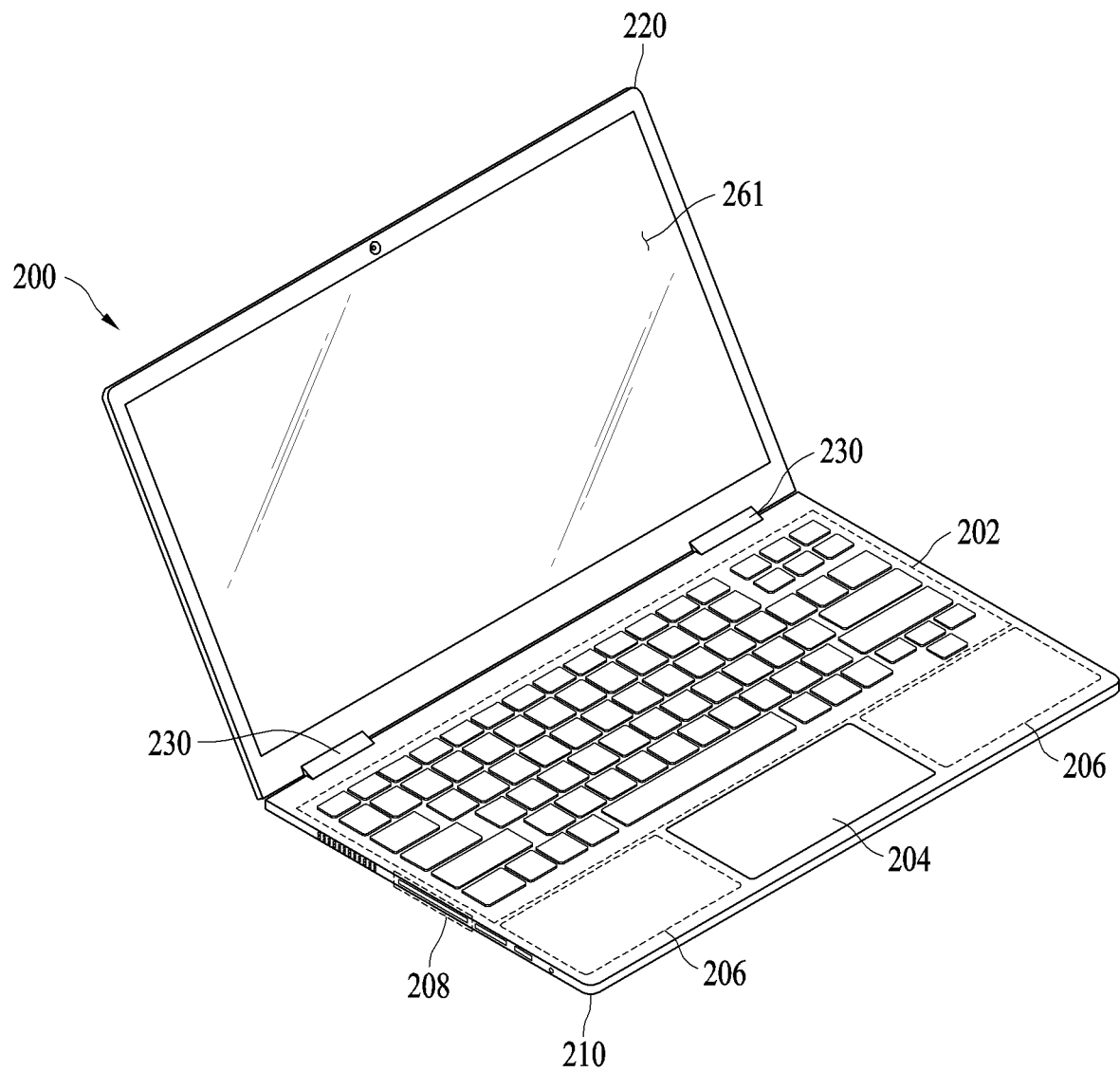
FIG. 2 is a perspective view illustrating an electronic device according to an embodiment.

FIG. 2 is a perspective view illustrating an electronic device according to an embodiment.

Referring to FIG. 2, an electronic device 200 may include a first housing 210, a second housing 220, and a connector 230 for connecting the first housing 210 to the second housing 220. The electronic device 200 may include, for example, a smartphone, a laptop computer, a tablet personal computer (PC), an e-book reader, a portable multimedia device, a portable medical device, a wearable device, or a home appliance.

The first housing 210 may include a keyboard 202, a touchpad 204, a palm rest 206, and an antenna module 208. The keyboard 202 (e.g., the input module 150 of FIG. 1) may include a plurality of keys. The keyboard 202 is configured to receive an input of numeric information or character information. The keyboard 202 may include a plurality of input keys and function keys for setting various functions of the electronic device 200. The function keys may include an arrow key, a volume key, and/or a shortcut key, which are set to perform a designated function. The keyboard 202 may include any one of a query keypad, a 3×4 keypad, a 4×3 keypad, or a touch key. The touchpad 204 may replace a mouse function. The touchpad 204 may input an instruction for selecting or executing an application displayed on a display 261. The palm rest 206 may be a support for decreasing wrist fatigue of a user using the keyboard 202. The antenna module 208 may transmit or receive a signal or power to or from an external electronic device (e.g., the electronic devices 102 and 104 and/or the server 108 of FIG. 1). The first housing 210 may include at least one first electronic component. For example, the at least one first electronic component may include the processor 120, the memory 130, and the sensor module 176 of FIG. 1 and/or other electronic components.

The second housing 220 may include the display 261. The display 261 may include a screen for displaying information to be provided for a user or information input by the user by using various menus of the electronic device 200 and the keyboard 202. The screen may include at least one of a liquid crystal display (LCD), an organic light-emitting diode (OLED) display, an active-matrix organic light-emitting diode (AMOLED) display, a flexible display, or a transparent display. The screen may provide, based on use of the electronic device 200, at least one of various screens, for example, a home screen, a menu screen, a lock screen, a game screen, a webpage screen, a call screen, or a music or video play screen. The second housing 220 may include at least one second electronic component. For example, the second electronic component may include the camera module 180 and the sound output module 155 of FIG. 1 and/or other electronic components.

The connector 230 may rotate the first housing 210 and the second housing 220 relative to each other. For example, the electronic device 200 may change between a closed state and an open state, in which the first housing 210 and the second housing 220 practically face each other in the closed state and one of the first housing 210 and the second housing 220 rotates with respect to the other. The connector 230 includes a hinge structure for mechanically connecting the first housing 210 to the second housing 220. The connector 230 electrically connects the first housing 210 to the second housing 220. For example, the connector 230 may include a flexible PCB.

Figure 3:
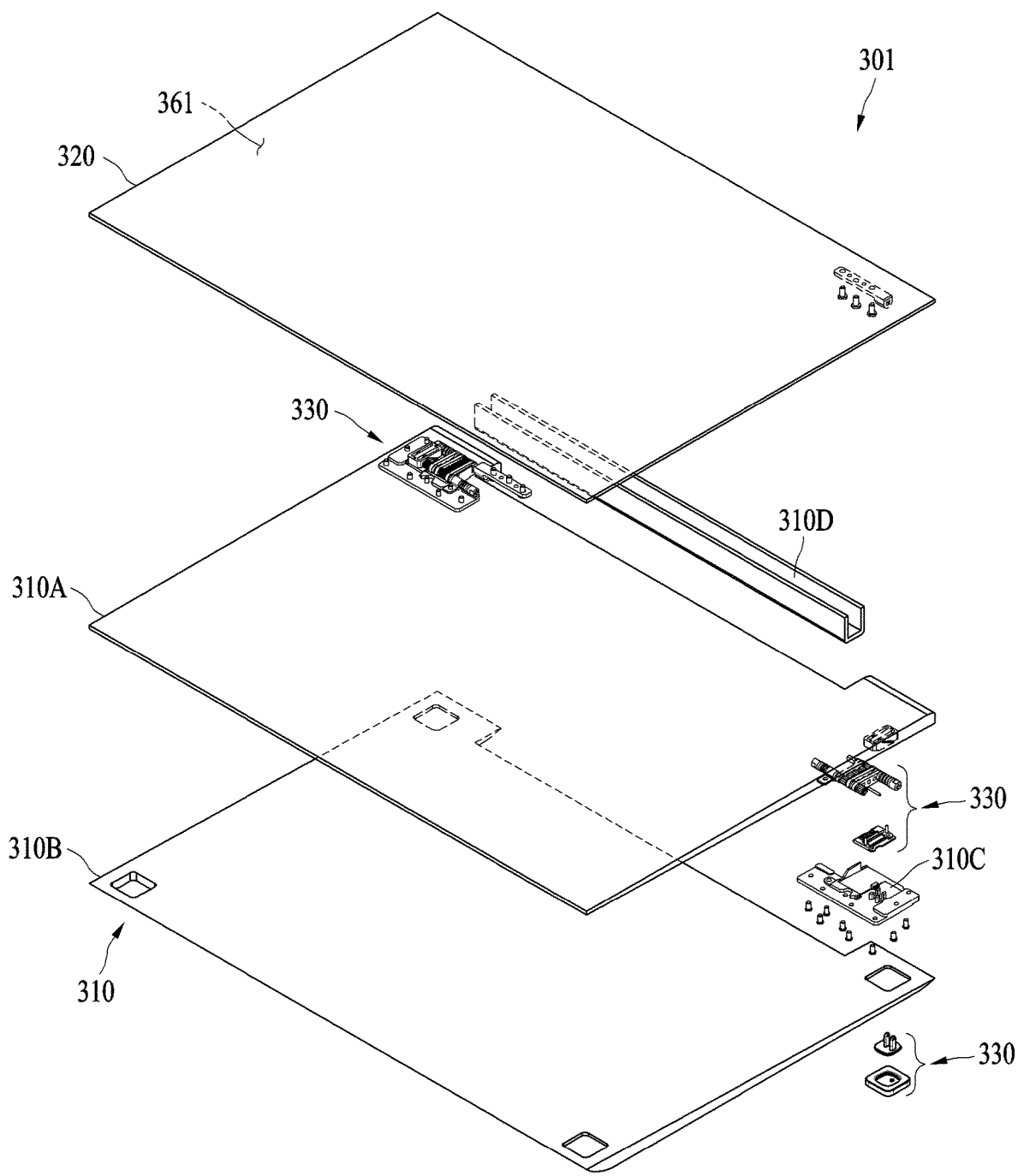
FIG. 3 is an exploded perspective view illustrating an electronic device according to an embodiment.

FIG. 3 is an exploded perspective view illustrating an electronic device according to an embodiment. Referring to FIG. 3, an electronic device 301 may include a first housing 310, a second housing 320, a pair of lifting structures 330 configured to operate based on rotation of the second housing 320 relative to the first housing 310, and a display 361 in the second housing 320.

The first housing 310 includes a first cover 310A (e.g., an upper cover) and a second cover 310B (e.g., a lower cover) facing the first cover 310A. The first housing 310 includes at least one first electronic component on the first cover 310A, on the second cover 310B, and/or between the first and second covers 310A and 310B. For example, the at least one first electronic component may include the processor 120, the memory 130, the power management module 188, the battery 189, the communication module 190, and the antenna module 197 of FIG. 1 and/or other electronic components.

The first housing 310 may include a pair of supporters 310C configured to respectively support the pair of lifting structures 330. The pair of supporters 310C may be located on the second cover 310B.

The first housing 310 may include a protection structure 310D at least partially enclosing the pair of lifting structures 330. The protection structure 310D may be between the pair of lifting structures 330 and on the second cover 310B.

The second housing 320 may include at least one second electronic component. For example, the second electronic component may include the display module 160 and the camera module 180 of FIG. 1 and/or other electronic components.

One lifting structure 330 of the pair of lifting structures 330 may be configured to connect a first part (e.g., the left side) of the first housing 310 to a first part (e.g., the left side) of the second housing 320, and to elevate (i.e., lift) the first part of the first housing 310 above a reference surface (e.g., the ground) on which the first housing 310 lies. The other lifting structure 330 of the pair of lifting structures 330 may be configured to connect a second part (e.g., the right side) of the first housing 310 to a second part (e.g., the right side) of the second housing 320 and to elevate (i.e., lift) the second part of the first housing 310 above the reference surface on which the first housing 310 lies, in which the second part of the first housing 310 is different from the first part of the first housing 310 and the second part of the second housing 320 is different from the first part of the second housing 320.

Referring to FIGS. 3 to 19, at least one of the pair of lifting structures 330 may include a hinge structure for rotating the first housing 310 and the second housing 320 relative to each other and a support structure for supporting the electronic device 301 by lifting the first housing 310 above the reference surface. The hinge structure and the support structure of the at least one lifting structure 330 may be mechanically and operationally connected to each other.

Figure 4:
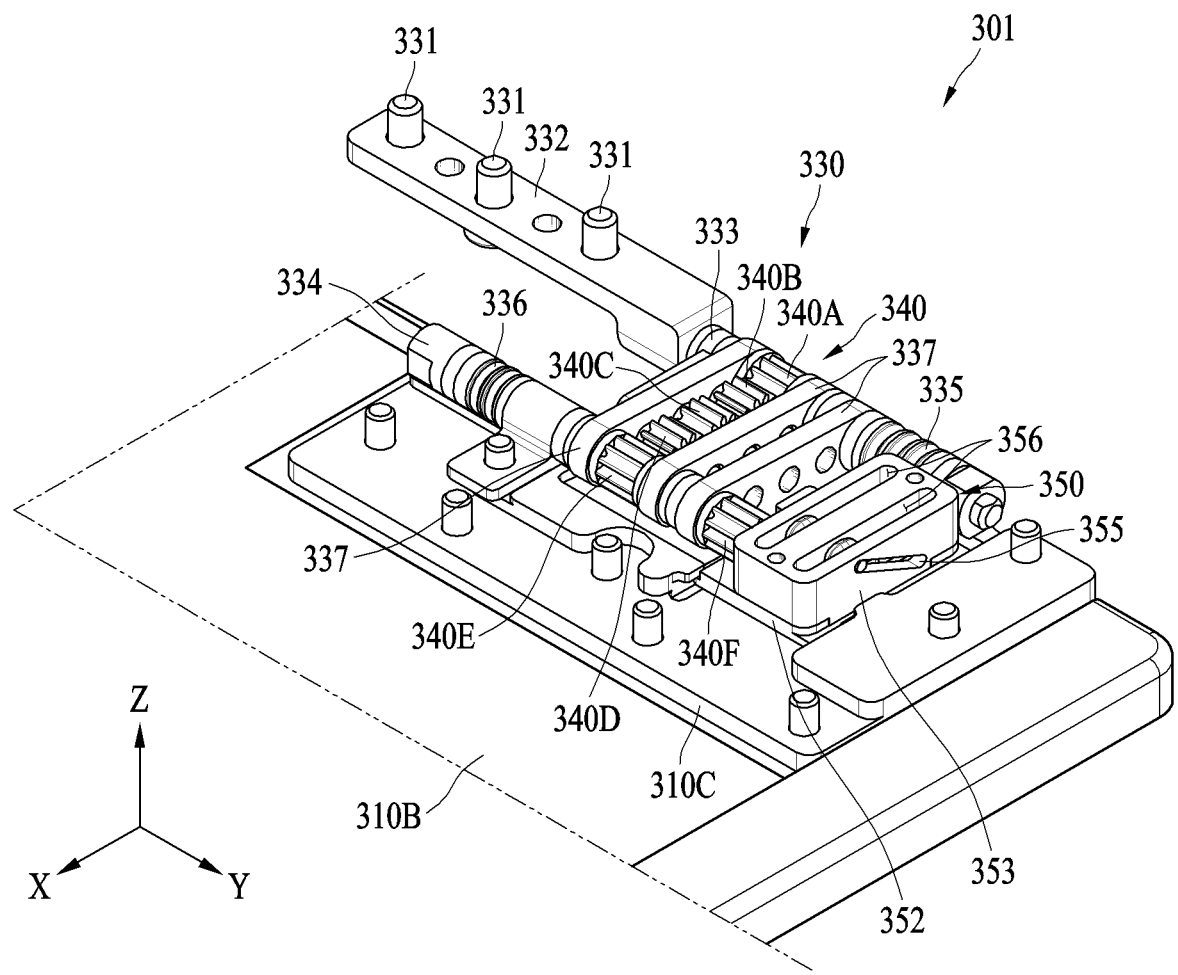
FIG. 4 is a perspective view illustrating a lifting structure viewed in one direction, according to an embodiment.

FIG. 4 is a perspective view illustrating the at least one lifting structure 330 viewed in one direction, according to an embodiment.

The at least one lifting structure 330 may include a fixing body 332 including at least one fixing hole and at least one fastening member 331 configured to fix the fixing body 332 to the second housing 320 through the at least one fixing hole. The fastening member 331 may include, for example, a screw. As illustrated in FIG. 4, three fastening members 331 may be provided.

The at least one lifting structure 330 may include a first shaft 333 and a second shaft 334. The first shaft 333 may be connected to one edge of the fixing body 332. The second shaft 334 may be fixed to the second cover 310B. The second shaft 334 may be provided on a respective supporter 310C, with the second shaft 334 being supported by the respective supporter 310C. The second shaft 334 may be fixed to the respective supporter 310C by at least one respective fastening member 331 (e.g., a screw). The first shaft 333 and the second shaft 334 may be spaced apart from each other in one direction (e.g., a +/−X direction) of the first housing 310. The first shaft 333 and the second shaft 334 may be substantially parallel to each other.

The at least one lifting structure 330 may include a first elastic body 335 and a second elastic body 336, in which the first elastic body 335 is configured to enclose the first shaft 333 and elastically move in an axis direction (e.g., a +/−Y direction) of the first shaft 333 and the second elastic body 336 is configured to enclose the second shaft 334 and elastically move in the axis direction (e.g., the +/−Y direction) of the second shaft 334. For example, the first elastic body 335 and the second elastic body 336 may include a compression spring configured to compress and expand.

The at least one lifting structure 330 may include at least one link 337 connecting the first shaft 333 to the second shaft 334, with FIG. 4 showing three links 337. The link 337 may fix the first shaft 333 and the second shaft 334 such that the first shaft 333 and the second shaft 334 move only in a predefined rotation manner. The link 337 may be elastically supported by the first elastic body 335 and/or the second elastic body 336.

Figure 5:
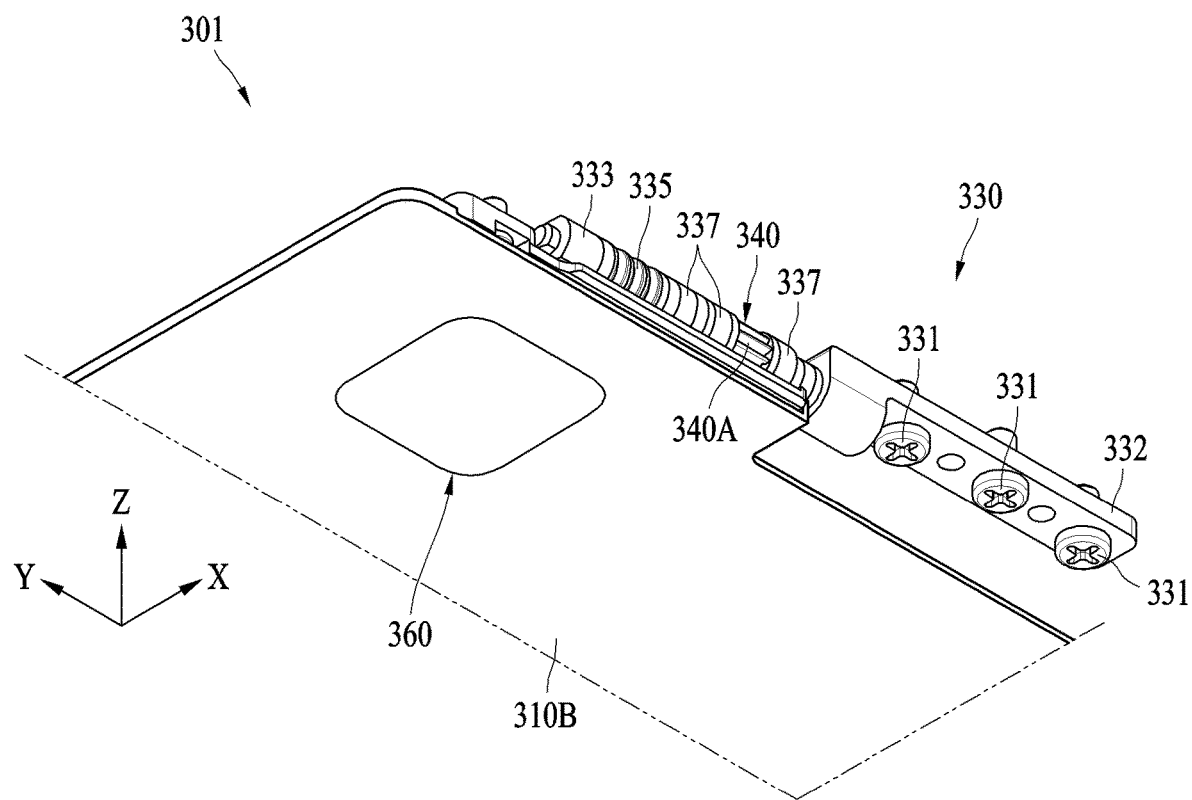
FIG. 5 is a perspective view illustrating the lifting structure viewed in another direction, according to an embodiment.
Figure 6:
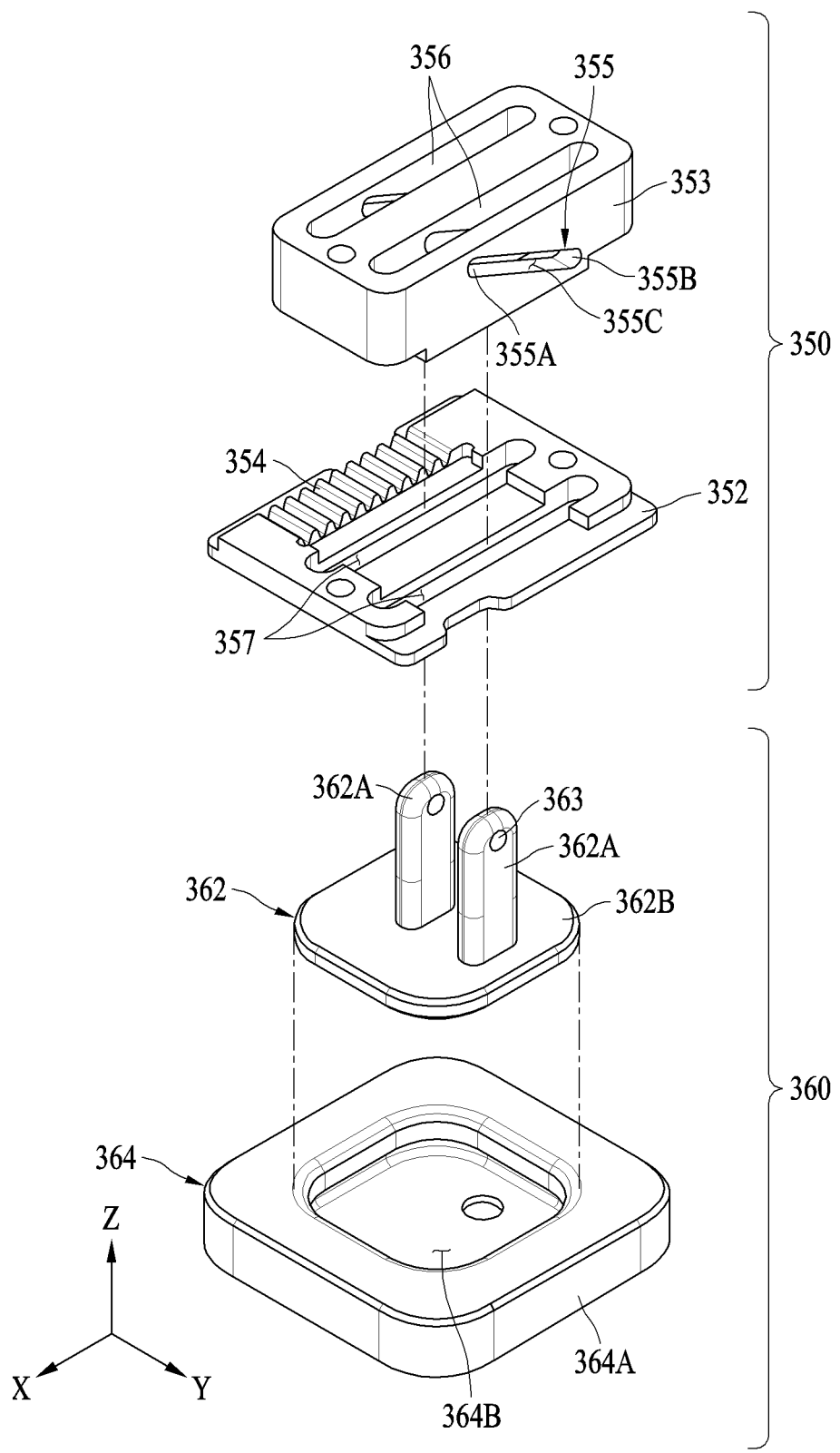
FIG. 6 is an exploded perspective view illustrating a first moving body and a second moving body of FIGS. 4 and 5.
Figure 7:
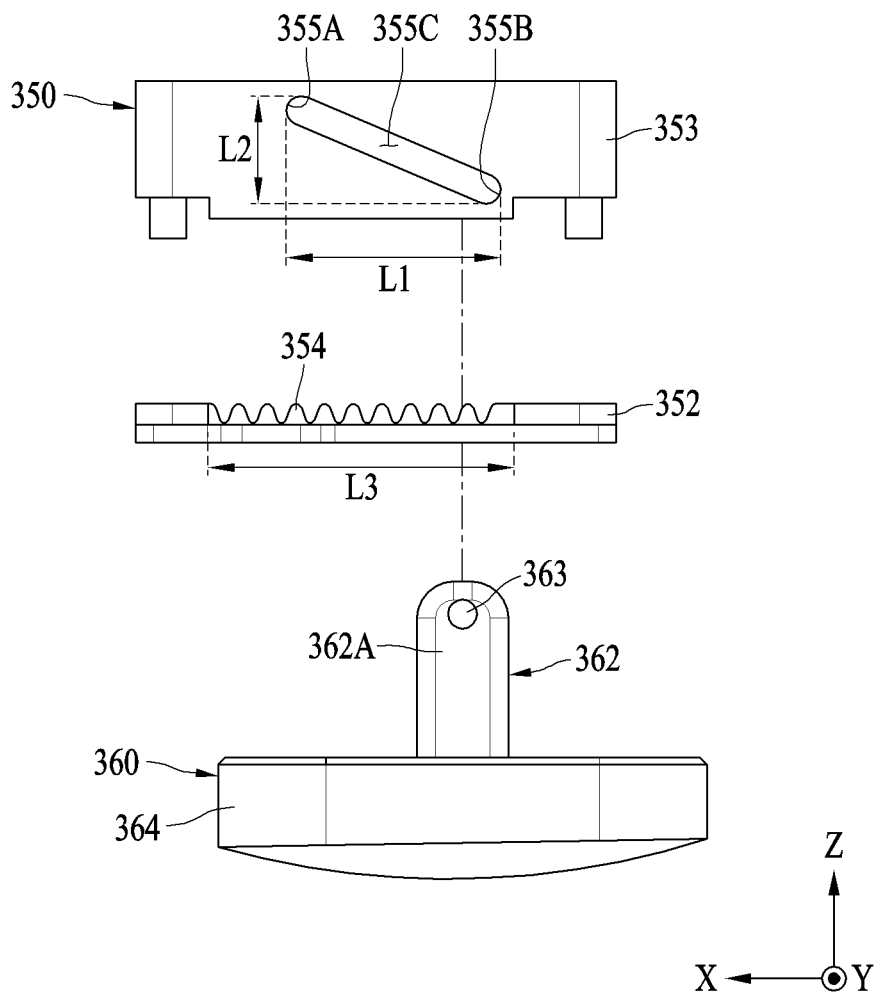
FIG. 7 is a side view illustrating the first moving body and the second moving body of FIGS. 4 and 5.

FIG. 5 is a perspective view illustrating the lifting structure viewed in another direction, according to an embodiment. FIG. 6 is an exploded perspective view illustrating the first moving body and the second moving body of FIGS. 4 and 5. FIG. 7 is a side view illustrating the first moving body and the second moving body of FIGS. 4 and 5.

The at least one lifting structure 330 may include a gear assembly 340 including at least one gear (e.g., a plurality of connecting gears 340A, 340B, 340C, 340D, and 340E, or a driven gear 340F) configured to connect the first shaft 333 to the second shaft 334 and transmit power (e.g., torque) between the first and second shafts 333 and 334. For example, when the second housing 320 rotates relative to the first housing 310, power may be transmitted to the fixing body 332 fixed in the second housing 320 and the first shaft 333 connected to the fixing body 332. The power is transferred from the first shaft 333 to the second shaft 334 through the gear assembly 340.

The gear assembly 340 includes the plurality of connecting gears 340A, 340B, 340C, 340D, and 340E. The plurality of connecting gears 340A, 340B, 340C, 340D, and 340E may include a first connecting gear 340A, a second connecting gear 340B, a third connecting gear 340C, a fourth connecting gear 340D, and a fifth connecting gear 340E. The first connecting gear 340A is connected to the first shaft 333. The second connecting gear 340B is engaged with and driven by the first connecting gear 340A and configured to rotate in a rotational direction different from a rotational direction of the first connecting gear 340A. The third connecting gear 340C is engaged with and driven by the second connecting gear 340B and configured to rotate in a rotational direction (e.g., the same rotational direction as the rotational direction of the first connecting gear 340A) different from the rotational direction of the second connecting gear 340B. The fourth connecting gear 340D is engaged with and driven by the third connecting gear 340C and configured to rotate in a rotational direction (e.g., the same rotational direction as the rotational direction of the second connecting gear 340B) different from the third connecting gear 340C. The fifth connecting gear 340E is connected to the second shaft 334, engaged with and driven by the fourth connecting gear 340D, and configured to rotate in a rotational direction (e.g., the same rotational direction as the rotational direction of the first connecting gear 340A) different from the rotational direction of the fourth connecting gear 340D. In an embodiment, each of the plurality of connecting gears 340A, 340B, 340C, 340D, and 340E may include or be a spur gear. At least one of the connecting gears 340A, 340B, 340C, 340D, and 340E may include gears in a predetermined shape suitable to decrease a gap between gears.

The plurality of connecting gears 340A, 340B, 340C, 340D, and 340E may be arranged in a row in one direction (e.g., the +/−X direction). The plurality of connecting gears 340A, 340B, 340C, 340D, and 340E may be positioned between a pair of links of the at least one link 337. At least one (e.g., the second, third, or fourth connecting gears 340B, 340C, or 340D) of the plurality of connecting gears 340A, 340B, 340C, 340D, and 340E may be rotatably connected to each link of the pair of links of the at least one link 337.

Figure 8:
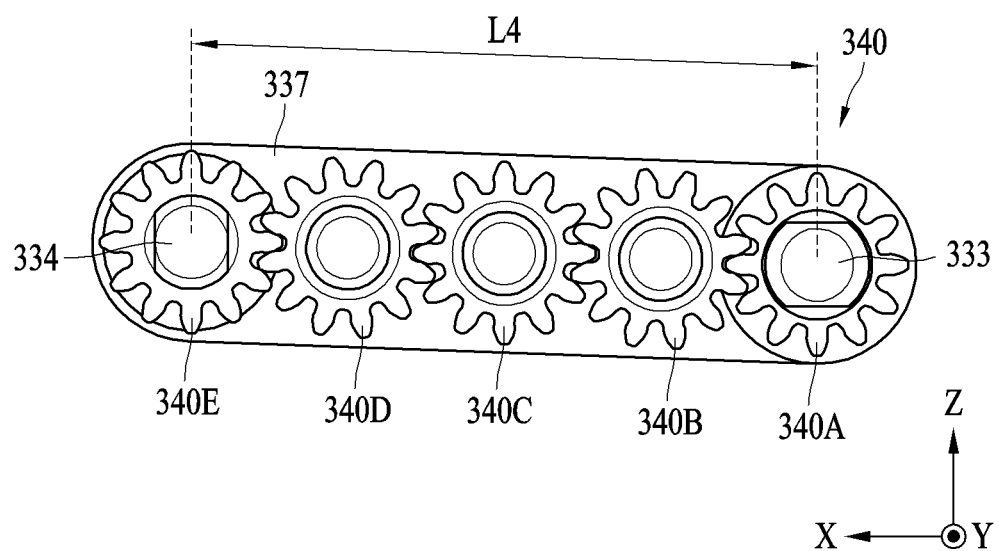
FIG. 8 is a side view illustrating a gear assembly of FIG. 4.

FIG. 8 is a side view illustrating a gear assembly of FIG. 4. As shown in FIG. 8, a total length L4 of the gear assembly 340 in which the plurality of connecting gears 340A, 340B, 340C, 340D, and 340E are engaged may be defined as a distance between the center of the first connecting gear 340A and the center of the fifth connecting gear 340E. The distance may be determined based on the first housing 310 having a decreased thickness (e.g., a length in the +/−Z direction). The distance may be determined to secure an increased lift height (e.g., a height in the +/−Z direction above the reference surface).

The number of connecting gears (e.g., the plurality of connecting gears 340A, 340B, 340C, 340D, and 340E) may be determined based on a maximum rotation angle of the second housing 320 on the first housing 310. For example, in the electronic device 301, in which the second housing 320 forms a maximum rotation angle of approximately 180 degrees on the first housing 310, the number of connecting gears (e.g., the plurality of connecting gears 340A, 340B, 340C, 340D, and 340E) may be determined to be five.

In an embodiment, the gear assembly 340 may include only one connecting gear engaged both with the first connecting gear 340A and the fifth connecting gear 340E. In an embodiment, the gear assembly 340 may include fewer or more connecting gears than illustrated in FIGS. 4, 5 and 8.

The gear assembly 340 may include the driven gear 340F that receives power from at least one of the connecting gears 340A, 340B, 340C, 340D, and 340E. The driven gear 340F is connected to the second shaft 334. The driven gear 340F is spaced apart from the fifth connecting gear 340E in the axis direction (e.g., the +/−Y direction) of the second shaft 334. The fifth connecting gear 340E and the driven gear 340F may be elastically supported by the second elastic body 336 on the second shaft 334. The driven gear 340F may include or may be a pinion gear.

The at least one lifting structure 330 may include a first moving body 350 and a second moving body 360, in which the first moving body 350 is configured to move, in the first housing 310, in one direction (e.g., the +/−X-direction) and the second moving body 360 is configured to move in another direction (e.g., the +/−Z-direction) from the first housing 310. For example, when the second housing 320 rotates on the first housing 310, power may be transmitted sequentially to the fixing body 332, to at least one connecting gear 340A, 340B, 340C, 340D, or 340E, and to the driven gear 340F. The first moving body 350 may receive the power from the driven gear 340F and move in one direction (e.g., the +/−X-direction), and the second moving body 360 may move in another direction (e.g., the +/−Y-direction) from the first housing 310. Accordingly, the first housing 310 is lifted above the reference surface (e.g., the ground) or lowered to the reference surface.

As shown in FIG. 6, the first moving body 350 may include a first part 352 (e.g., a base part) and a second part 353 (e.g., a protruding part) that protrudes from the first part 352 in one direction (e.g., the +Z-direction). The first part 352 and the second part 353 may be separably coupled to each other. The separably coupled structure of the first and second parts 352 and 353 may allow a component (e.g., a guide gear 354) in the first part 352 and/or a component (e.g., a first guide rail 355) in the second part 353 to be easily manufactured. When the components in the first and second parts 352 and 353 are easily manufactured, the first part 352 and the second part 353 may be seamlessly integrated as one body.

The first part 352 includes the guide gear 354 that is configured to engage with and be driven by the driven gear 340F. The guide gear 354 may include or may be, for example, a rack gear. The guide gear 354 may extend along a first direction (e.g., the +/−X direction), on one surface (e.g., the upper surface) of the first part 352. When driven by the guide gear 354, the driven gear 340F rotates in a first rotational direction (e.g., a clockwise direction on a +Y axis), and the first part 352 receives a force to move in the +X direction. When the driven gear 340F engaged with the guide gear 354 rotates in a second rotational direction (e.g., a counterclockwise direction on the +Y axis) opposite to the first rotational direction, the first part 352 receives force to move in the −X direction.

As illustrated in FIG. 6, a length L3 of the guide gear 354 may be determined based on the dimension of the first guide rail 355. For example, the length L3 of the guide gear 354 may be determined based on a first direction length L1 (e.g., a +/−X-direction length) of a first edge 355A and a second edge 355B of the first guide rail 355 and/or a second direction length L2 (e.g., a +/−Z-direction length) of the first edge 355A and the second edge 355B of the first guide rail 355.

The first part 352 of the first moving body 350 may include at least one guide opening 357 configured to guide at least some part of the second moving body 360. As illustrated in FIG. 6, two guide openings 357 are provided between top and bottom surfaces of the first part 352, in the Z-direction.

The second part 353 of the first moving body 350 may include at least one first guide rail 355 configured to engage with at least some part of the second moving body 360. As illustrated in FIG. 6, the first guide rail 355 is provided on one surface (e.g., a side surface) of the second part 353 in the Y-direction.

The first edge 355A and the second edge 355B of the first guide rail 355 are closed, with the second edge 355B being opposite to the first edge 355A, and having a slot 355C extending between the first and second edges 355A and 355B.

The slot 355C may be obliquely formed in one surface (e.g., the side surface) of the second part 353. For example, the first edge 355A may be spaced farther apart than the second edge 355B from the first part 352 in the one direction (e.g., +Z direction), and the slot 355C is formed in an oblique direction intersecting with each of the +/−X-direction and the +/−Z-direction on an XZ plane. The first guide rail 355 in the oblique direction functions as a movement redirection mechanism and allows the second moving body 360 to move in a direction different from a moving direction of the first moving body 350 that receives power from the gear assembly 340. On the other hand, when the electronic device 301 is in the open state with the second housing 320 being rotated relative to the first housing 310, the power that the first moving body 350 has received from the gear assembly 340 precludes or makes it less likely for the second moving body 360 to return to its original position due to the weight of the electronic device 301.

The slot 355C may be substantially linear. the slot 355C may be at least partially linear.

In an embodiment, the second part 353 may include at least one (e.g., two) slot 356 in another surface (e.g., the upper surface) of the second part 353.

The second moving body 360 may include a third part 362 (e.g., an engaging part) and a fourth part 364 (e.g., a foot part) configured to support the first housing 310 by supporting the third part 362. As illustrated in FIG. 6, the third part 362 and the fourth part 364 may be separably coupled to each other. In an embodiment, the third part 362 and the fourth part 364 may be seamlessly integrated as one body.

The third part 362 may include at least one pillar part 362A and a flange part 362B, with two pillar parts illustrated in FIG. 6. The at least one pillar part 362A is positioned on and extends in the one direction (e.g., Z direction) from the flange part 362B. The at least one pillar part 362A and the flange part 362B may be seamlessly integrated as one body. In an embodiment, the at least one pillar part 362A and the flange part 362B may be separably coupled to each other.

The at least one pillar part 362A is configured to pass through the at least one guide rail 356 in the first part 352 and to move along the at least one guide rail 356. For example, the at least one pillar part 362A may move in the +/−X-direction and the +/−Z-direction on an XZ plane. The supporter 310C may guide at least one pillar part 362A to move.

The at least one pillar part 362A may include an engaging portion 363 configured to engage with the first guide rail 355. The engaging portion 363 may include or may be, for example, a protrusion.

When the driven gear 340F starts to rotate in the first rotational direction (e.g., a clockwise direction on the +Y axis), the engaging portion 363 is positioned in or adjacent to the first edge 355A. When the driven gear 340F is driven by the guide gear 354 to rotate in the first rotational direction, the first part 352 moves in the +X-direction and the engaging portion 363 moves along the slot 355C from the first edge 355A to the second edge 355B.

When the driven gear 340F rotates in the second rotational direction (e.g., the counterclockwise direction on the +Y axis) opposite to the first rotational direction, the engaging portion 363 moves from the second edge 355B. When the driven gear 340F is driven by the guide gear 354 to rotate in the second rotational direction, the first part 352 moves in the −X-direction and the engaging portion 363 moves along the slot 355C from the second edge 355B to the first edge 355A.

The fourth part 364 includes a support body 364A that is configured to touch and rest on a reference surface (e.g., the ground) and a recess 364B in the support body 364A for accommodating the flange part 362B.

The third part 362 and/or the fourth part 364 may be at least partially formed from an elastic material. For example, the elastic material may include rubber.

Figure 9:
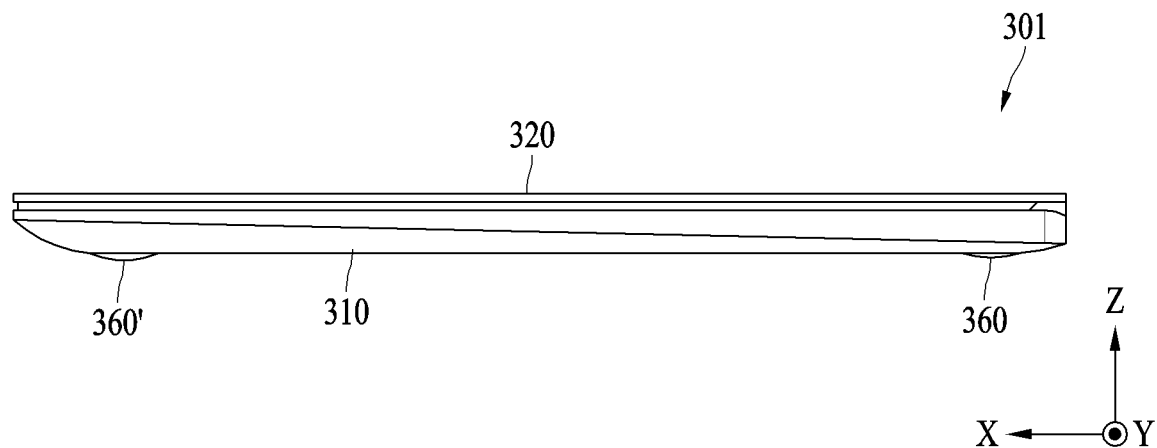
FIG. 9 is a side view illustrating an electronic device in a closed state, according to an embodiment.
Figure 10:
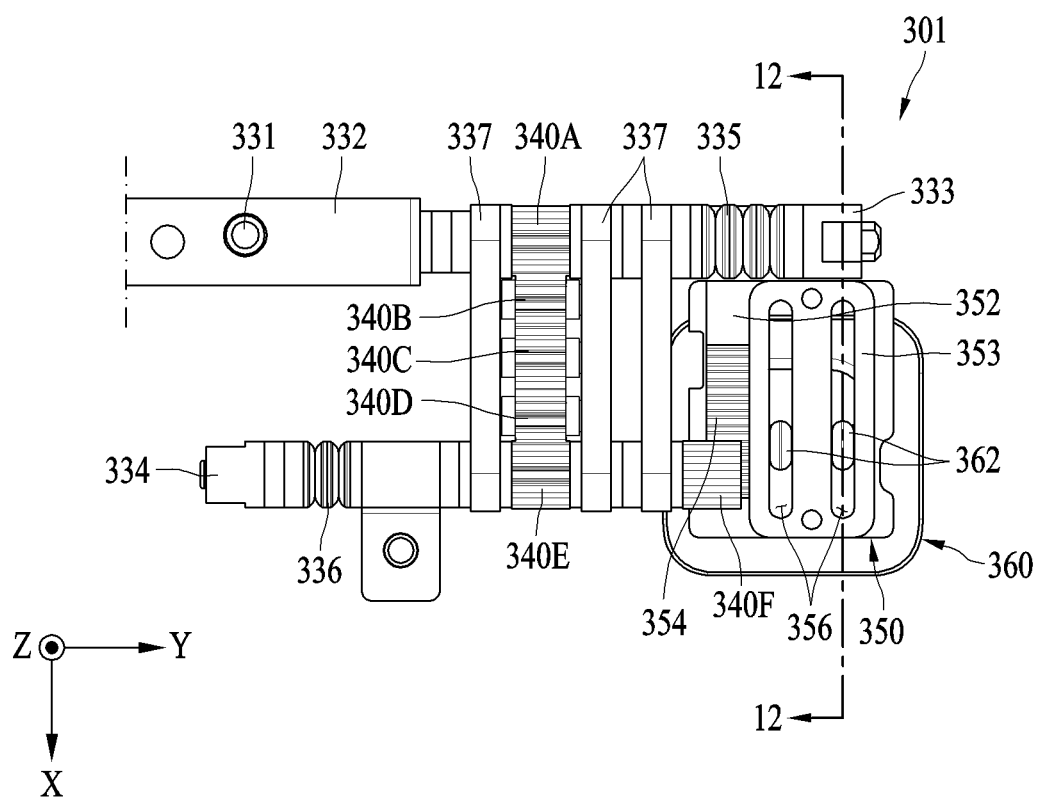
FIG. 10 is a plan view illustrating a lifting structure of the electronic device of FIG. 9.
Figure 11:
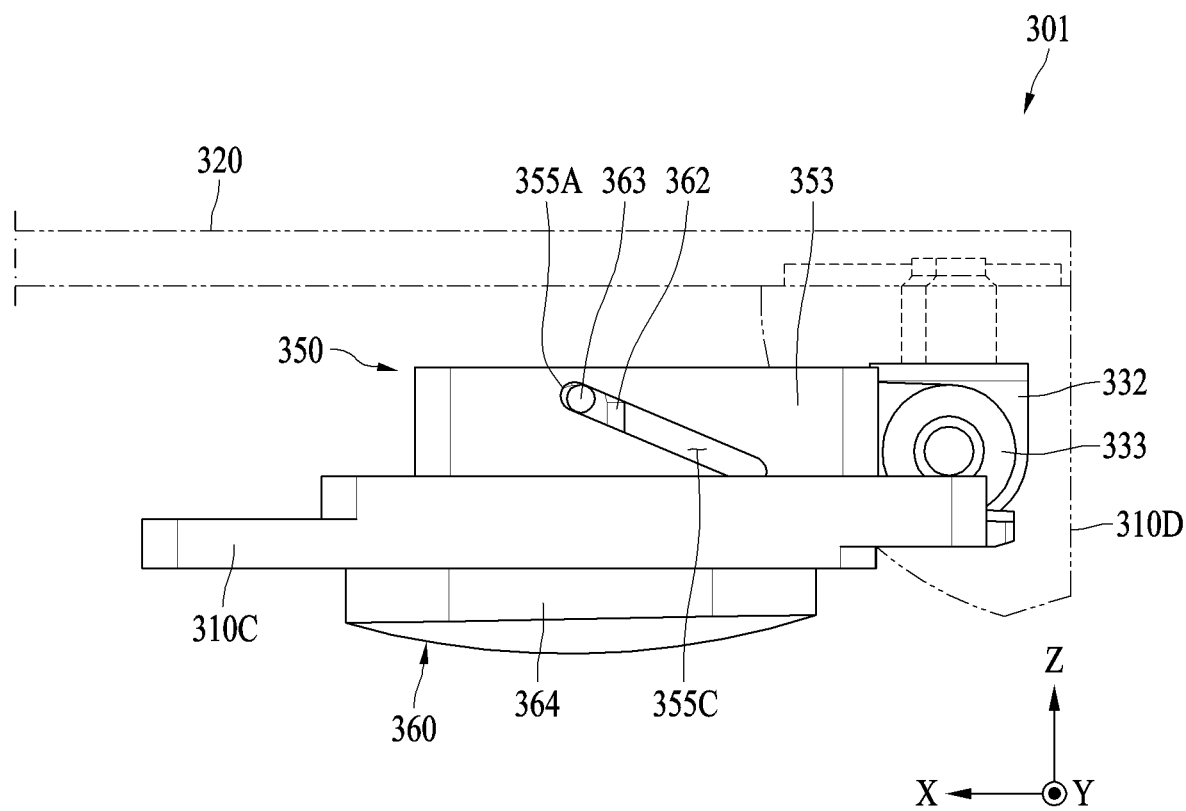
FIG. 11 is a side view illustrating the lifting structure of the electronic device of FIG. 9.
Figure 12:
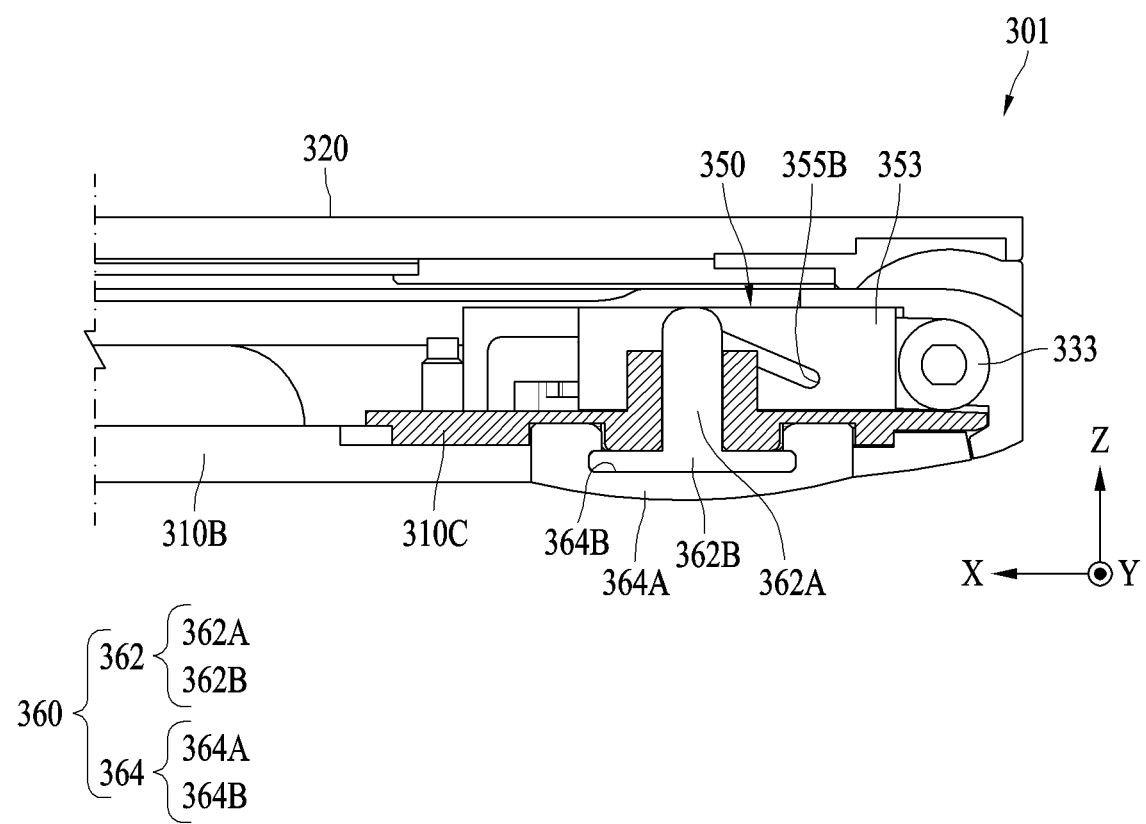
FIG. 12 is a cross-sectional view illustrating the lifting structure of FIG. 10, taken along line 12-12.

FIG. 9 is a side view illustrating an electronic device in the closed state, according to an embodiment. FIG. 10 is a plan view illustrating a lifting structure of the electronic device of FIG. 9. FIG. 11 is a side view illustrating the lifting structure of the electronic device of FIG. 9. FIG. 12 is a cross-sectional view illustrating the lifting structure of FIG. 10, taken along a 12-12 line.

Referring to FIGS. 9 to 12, the electronic device 301 may be in the closed state in which the first housing 310 and the second housing 320 are folded together to form a first angle of approximately zero degrees.

A plurality (e.g., two) of second moving bodies 360 may support, on the reference surface (e.g., the ground), the electronic device 301. As illustrated in FIG. 9, the electronic device 301 may be supported by an additional support structure (e.g., a support foot 360') that is fixed to a lower portion of the first housing 310 on a side opposite the second moving body 360.

As illustrated in FIG. 10, the driven gear 340F is positioned on one edge of the guide gear 354. As illustrated in FIG. 11, the engaging portion 363 is positioned at or adjacent to the first edge 355A. Accordingly, the flange part 362B and the support body 364A are retracted within the second cover 310B.

Figure 13:
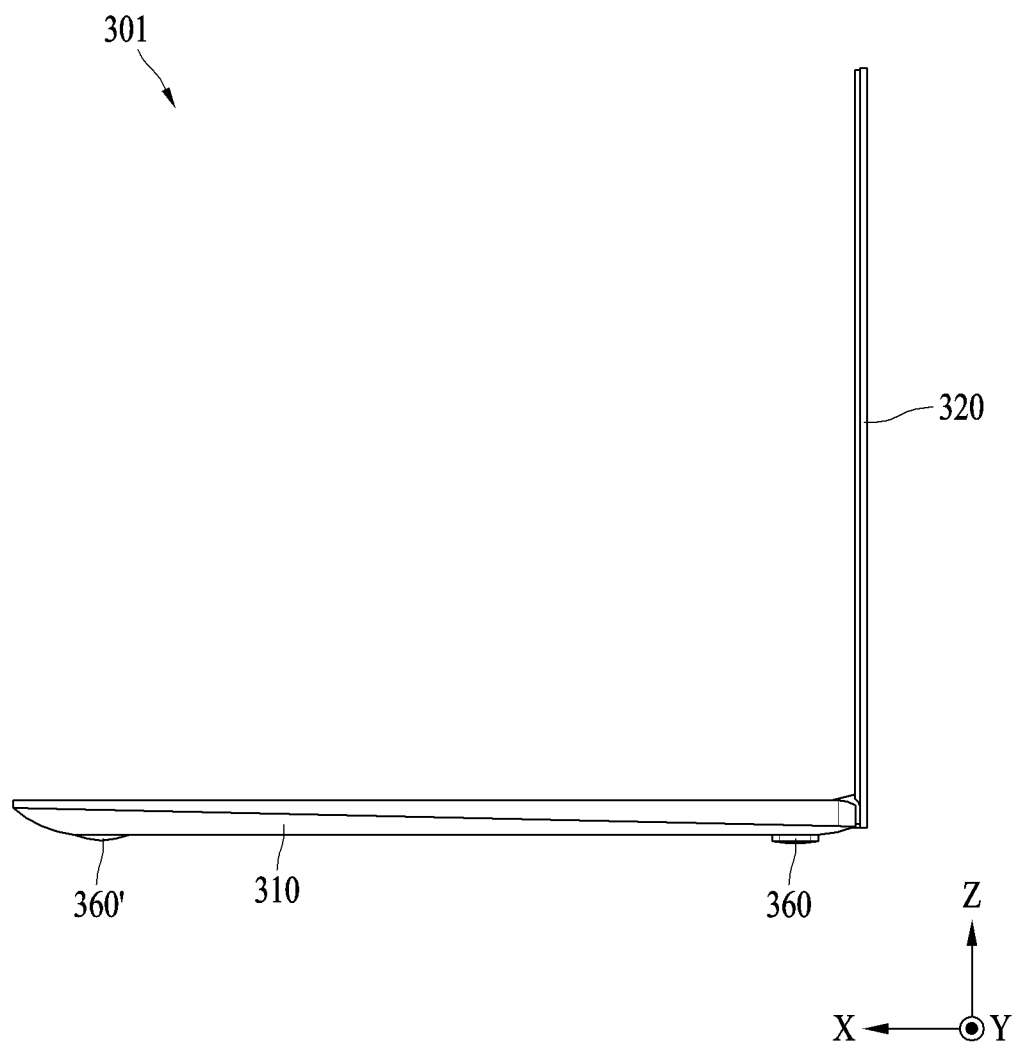
FIG. 13 is a side view illustrating an electronic device in a first open state, according to an embodiment.
Figure 14:
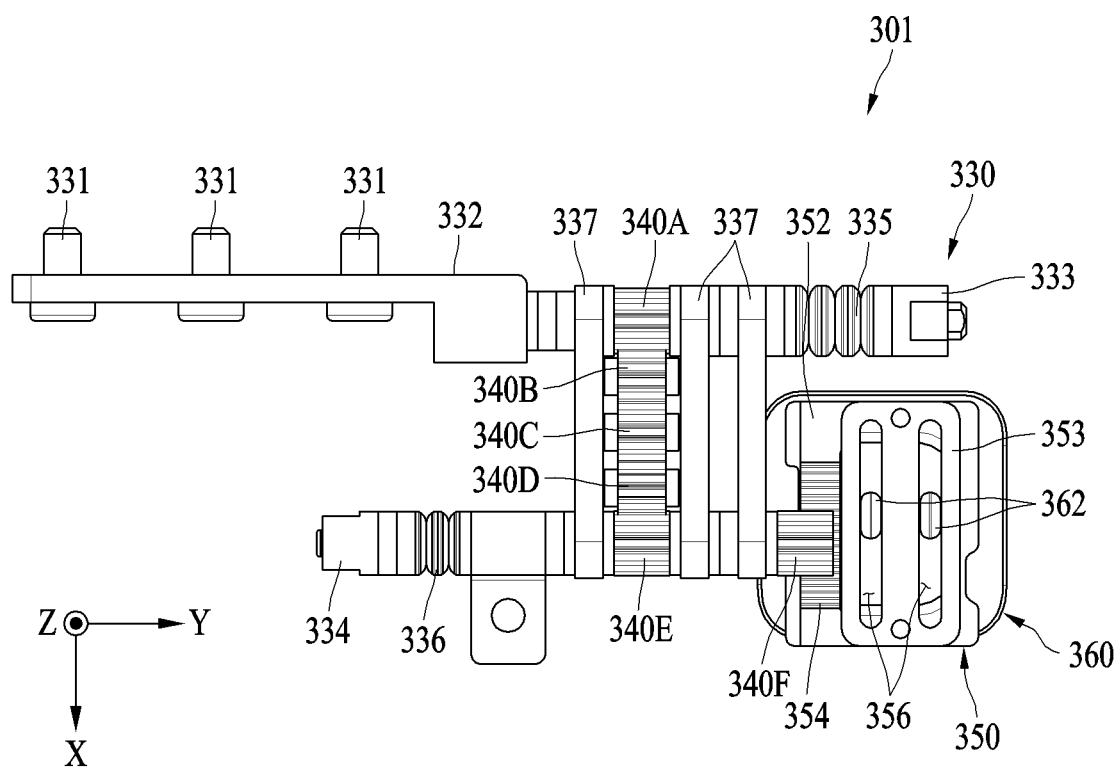
FIG. 14 is a plan view illustrating a lifting structure of the electronic device of FIG. 13.
Figure 15:
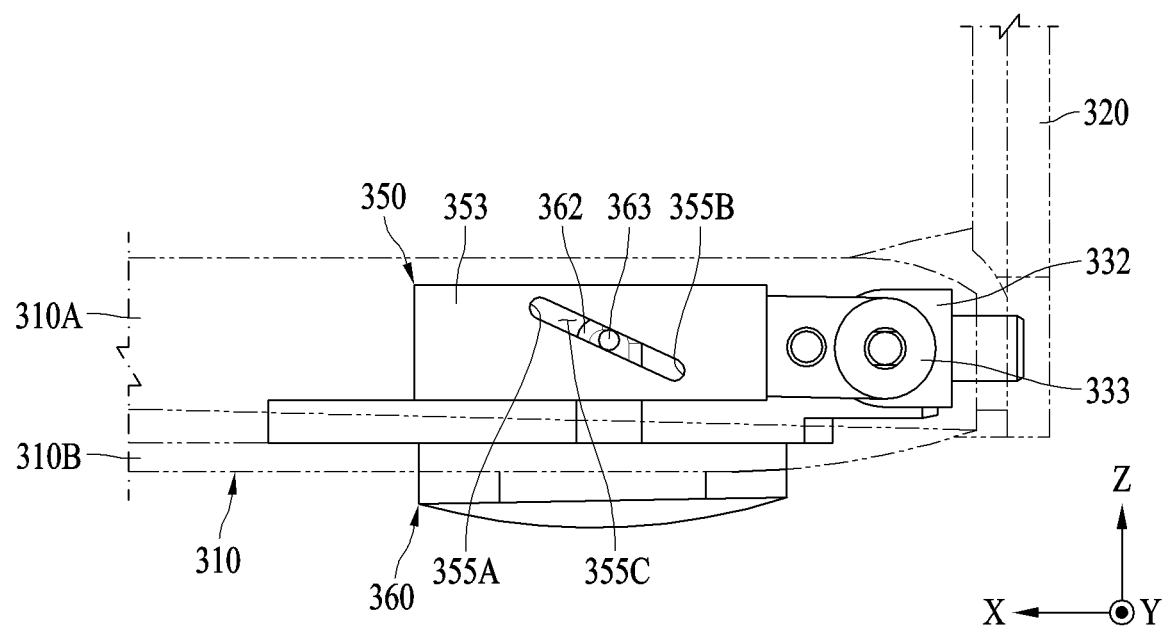
FIG. 15 is a side view illustrating the lifting structure of the electronic device of FIG. 13.

FIG. 13 is a side view illustrating an electronic device in the first open state, according to an embodiment. FIG. 14 is a plan view illustrating a lifting structure of the electronic device of FIG. 13. FIG. 15 is a side view illustrating the lifting structure of the electronic device of FIG. 13.

Referring to FIGS. 13 to 15, the electronic device 301 may switch from the closed state (e.g., the state of the electronic device 301 in FIGS. 9 to 12) to the first open state (e.g., an intermediate open state) in which the second housing 320 is unfolded from the first housing 310 and forms an intermediate angle of approximately 90 degrees.

While the electronic device 301 switches from the closed state to the first open state, the second housing 320 rotates relative to the first housing 310 in the first rotational direction (e.g., the clockwise direction on the +Y axis), the fixing body 332 and/or the first shaft 333 rotate and the plurality of connecting gears 340A, 340B, 340C, 340D, and 340E engage with one another and rotate.

When the plurality of connecting gears 340A, 340B, 340C, 340D, and 340E engage with one another and rotate in respective directions, the driven gear 340F connected to the second shaft 334 engages with the guide gear 354 and rotates in the first rotational direction and the first moving body 350 moves in a first direction (e.g., the +X direction), in which the first moving body 350 includes the first part 352 including the guide gear 354.

As the engaging portion 363 moves in the second direction along the slot 355C from the first edge 355A to the second edge 355B, the supporter 310C guides the at least one pillar part 362A (referring to FIG. 12). Accordingly, the third part 362 and the fourth part 364 move in a third direction (e.g., −Z-direction). Because the engaging portion 363 is in the slot 355C that is oblique, the engaging portion 363 obliquely moves toward the first edge 355A and the fourth part 364 moves the first housing 310 away from the reference surface.

Figure 16:
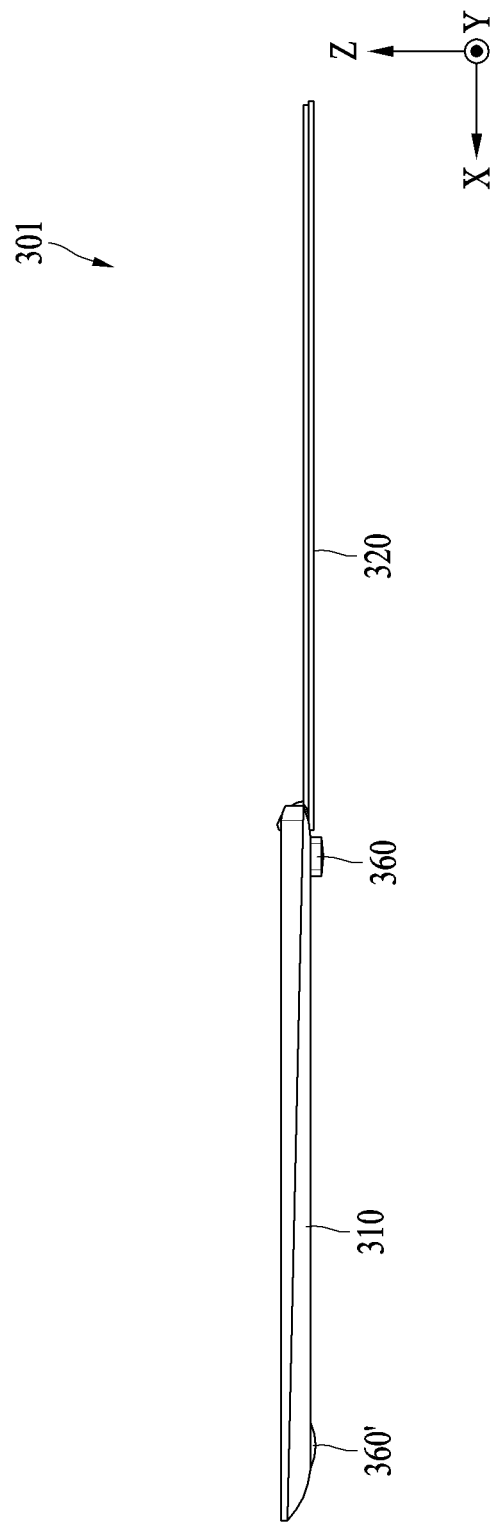
FIG. 16 is a side view illustrating an electronic device in a second open state, according to an embodiment.
Figure 17:
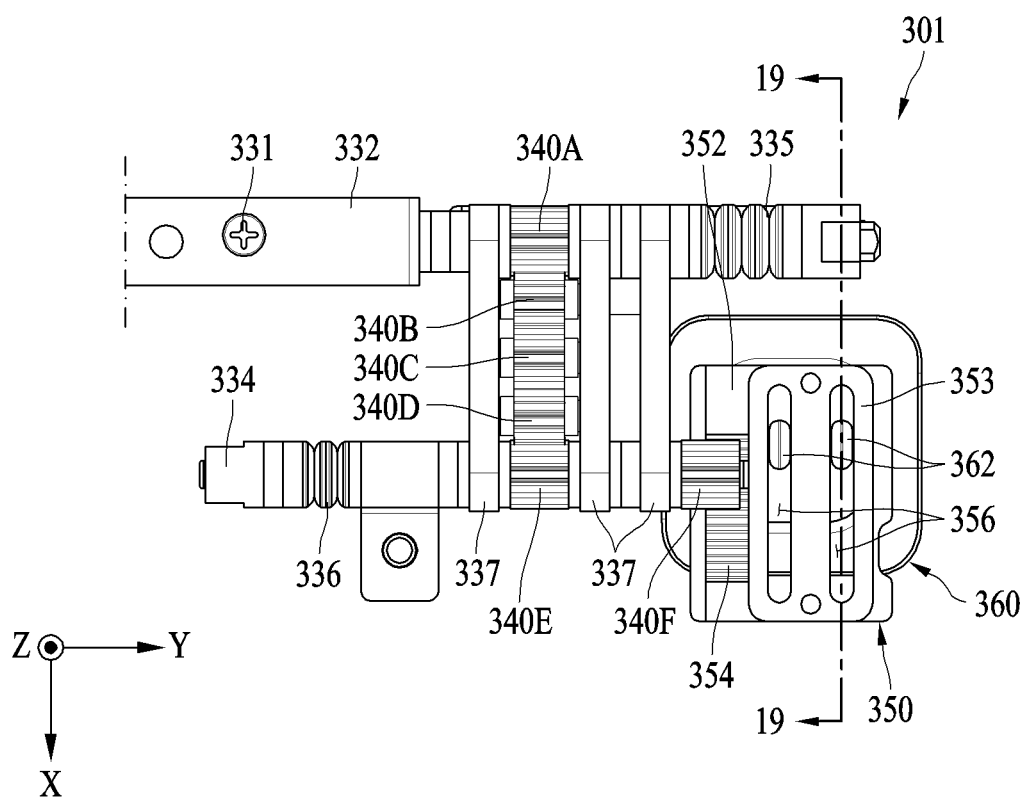
FIG. 17 is a plan view illustrating a lifting structure of the electronic device of FIG. 16.
Figure 18:
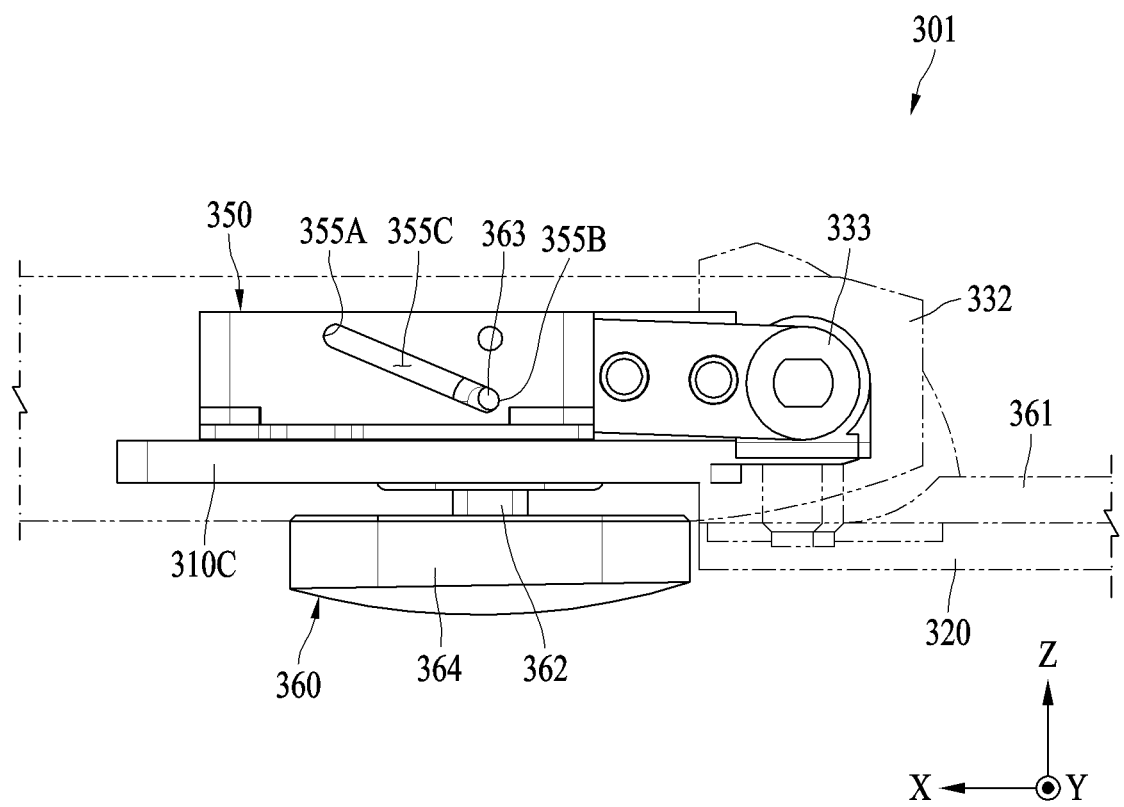
FIG. 18 is a side view illustrating the lifting structure of the electronic device of FIG. 16.
Figure 19:
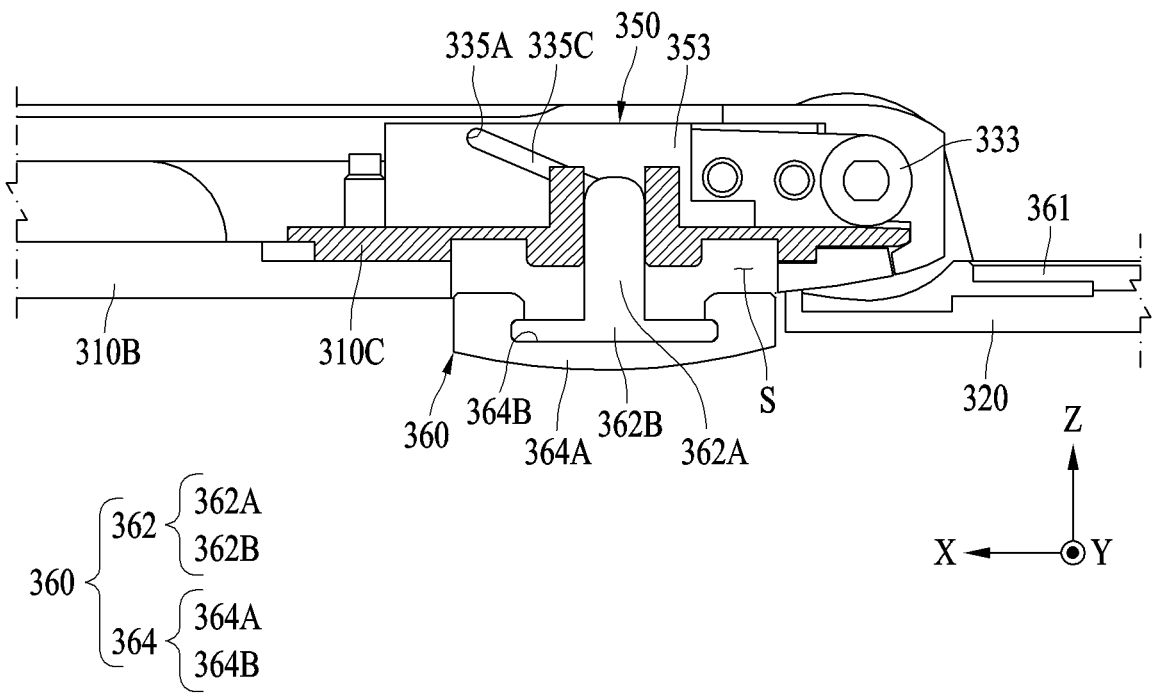
FIG. 19 is a cross-sectional view illustrating the lifting structure of FIG. 17, taken along line 19-19.

FIG. 16 is a side view illustrating an electronic device in the second open state, with the first housing 310 and second housing 320 forming a second angle of approximately 180 degrees. FIG. 17 is a plan view illustrating a lifting structure of the electronic device of FIG. 16. FIG. 18 is a side view illustrating the lifting structure of the electronic device of FIG. 16. FIG. 19 is a cross-sectional view illustrating the lifting structure of FIG. 17, taken along a 19-19 line.

Referring to FIGS. 16 to 19, the electronic device 301 may switch from the first open state (e.g., the state of the electronic device 301 in FIGS. 13 to 15) to the second open state (e.g., a completely open state) in which the second housing 320 is further unfolded from the first housing 310.

While the electronic device 301 switches from the first open state to the second open state, the second housing 320 further rotates relative to the first housing 310 in the first rotational direction (e.g., the clockwise direction on the +Y axis), the fixing body 332 and/or the first shaft 333 rotate, and the plurality of connecting gears 340A, 340B, 340C, 340D, and 340E engage with one another and rotate.

When the plurality of connecting gears 340A, 340B, 340C, 340D, and 340E engage with one another and rotate, the driven gear 340F connected to the second shaft 334 may rotate in the first rotational direction and the first moving body 350 may further move in a first direction (e.g., the +X-direction), in which the first moving body 350 includes the first part 352 including the guide gear 354. The driven gear 340F may be on the other edge of the guide gear 354.

The engaging portion 363 may move in the second direction along the slot 355C toward the second edge 355B and may be in the second edge 355B or adjacent to the second edge 355B. The third part 362 and the fourth part 364 may be separated from the supporter 310C and the second cover 310B and may form a space S (FIG. 19). Because the engaging portion 363 is in the slot 355C that is oblique, the engaging portion 363 may move toward the first edge 355A and the fourth part 364 may support the first housing 310 from the reference surface.

In the second open state of the electronic device 301, the fourth part 364 protrudes from the second cover 310B causing the corresponding portion of the second housing 320 not to touch the reference surface (e.g., the ground). Even when a rotational moment of the second housing 320 relative to the first housing 310 is excessive, the first housing 310 may be sufficiently lifted from the reference surface such that the second housing 320 may not touch the reference surface, and accordingly, and damage to a fully opened display 361 may be avoided.

The power applied by the user's hand to rotate the second housing 320 away from the first housing 310 transfers to and rotates the plurality of gears (e.g., the connecting gears 340A, 340B, 340C, 340D, and 340E) and the driven gear 340F. The first moving body 350 engaged with one gear (e.g., the driven gear 340F) of the plurality of gears (e.g., the connecting gears 340A, 340B, 340C, 340D, and 340E and the driven gear 340F) may move in the first direction (e.g., the +X direction or the front direction), and the second moving body 360 may move in the third direction (e.g., the −Z-direction or the downward direction) intersecting with (e.g., substantially perpendicular to) the first direction. In other words, the second moving body 360 starts at an initial height (e.g., a default height) from the reference surface and then protrudes in one direction (e.g., the −Z-direction) from one surface (e.g., the bottom surface) of the first housing 310, based on an angle formed by the first housing 310 and the second housing 320, thereby lifting the surface (e.g., the bottom surface) of the first housing 310.

When the first housing 310 and the second housing 320 form an angle of approximately 180 degrees, the second moving body 360 may further protrude from the surface (e.g., the bottom surface) of the first housing 310, and the display 361 may not touch the reference surface touched by the second moving body 360.

A state change of the electronic device 301 described with reference to FIGS. 9 to 19 may be performed in a reverse order of the described order, resulting in opposite operation. The at least one lifting structure 330 allows the second housing 320 to secure a sufficient rotational radius relative to the first housing 310 and enables the electronic device 301 to better diffuse heat generated therein by providing additional circulating air. In other words, when the second housing 320 rotates relative to the first housing 310, the display 361 may not touch the reference surface, and when the electronic device 301 is used with the second housing 320 to maintain a predetermined angle (e.g., approximately 140 degrees or approximately 180 degrees) relative to the first housing 310, the second moving body 360 may protrude from the surface (e.g., the bottom surface) of the first housing 310 and lift the first housing 310 from the reference surface. Accordingly, air may flow into a space between the surface of the first housing 310 and the reference surface and heat generated in the electronic device 301 may diffuse and/or decrease.

Figure 20:
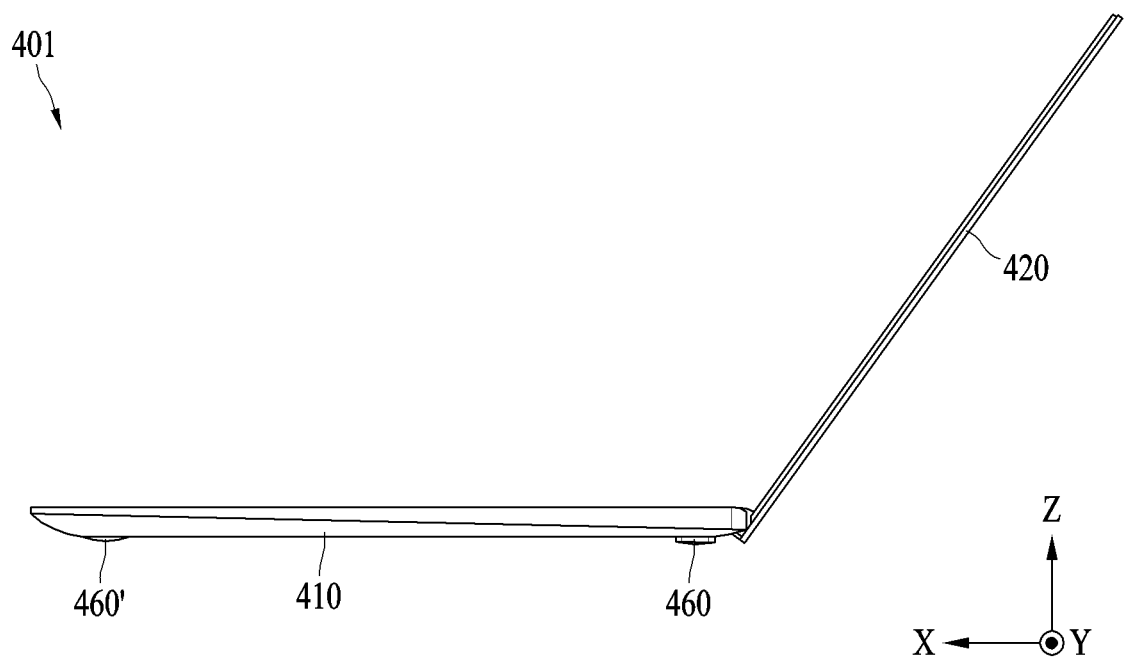
FIG. 20 is a side view illustrating an electronic device in an open state, according to an embodiment.

FIG. 20 is a side view illustrating an electronic device in an open state, according to an embodiment.

Referring to FIG. 20, an electronic device 401 may include a first housing 410 and a second housing 420 that form a maximum open angle (e.g., approximately 135 degrees) different from the maximum open angle (e.g., the second angle, which is approximately 180 degrees) of the second housing 320 relative to the first housing 310 as described with reference to FIGS. 3 to 19. A second moving body 460 and a support foot 460' may support the electronic device 401.

Figure 21:
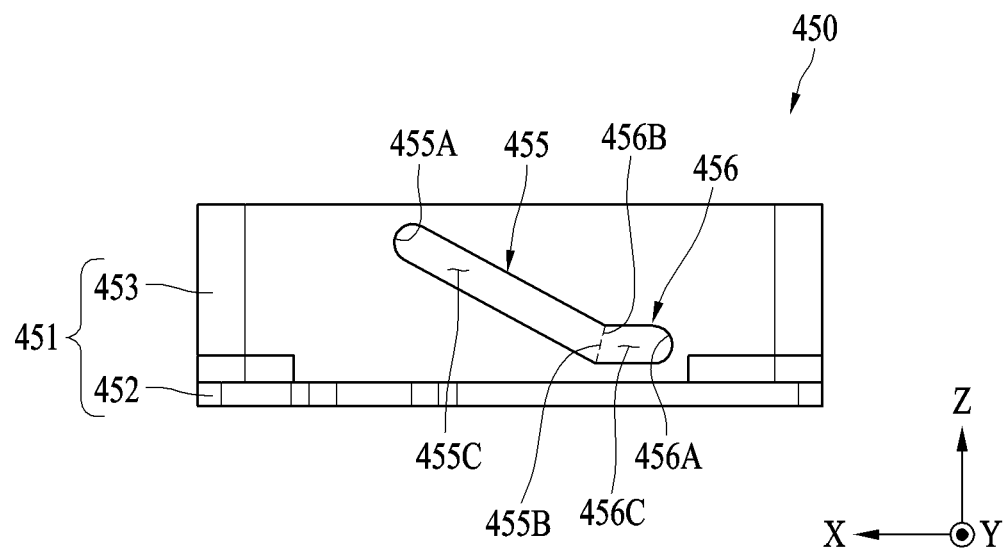
FIG. 21 is a side view illustrating a moving body according to an embodiment.

FIG. 21 is a side view illustrating a moving body according to an embodiment.

Referring to FIG. 21, a moving body 450 may include a first moving body 451. The first moving body 451 may include a first part 452 and a second part 453.

The second part 453 may include a first guide rail 455 and a second guide rail 456. The first guide rail 455 may include a first edge 455A that is closed, a second edge 455B that is open and opposite to the first edge 455A, and a first slot 455C obliquely extending between the first and second edges 455A and 455B. The second guide rail 456 may include a third edge 456A that is closed, a fourth edge 456B that is open, connected to the second edge 455B, and opposite to the third edge 456A, and a second slot 456C extending substantially in a horizontal direction (e.g., the +/−X-direction) between the third and fourth edges 456A and 456B.

An extending direction of the first slot 455C and an extending direction of the second slot 456C are designed differently from each other to form a maximum open angle of approximately 135 degrees between the first and second housings 410 and 420 (FIG. 20) when an engaging portion (e.g., the engaging portion 363 of FIGS. 3 to 19) of a second moving body 460 reaches the fourth edge 456B.

The length of the first slot 455C may be greater than the length of the second slot 456C. The maximum open angle formed by the first and second housings 410 and 420 corresponds to a ratio of a length first slot 455C to second slot 456C.

Figure 22:
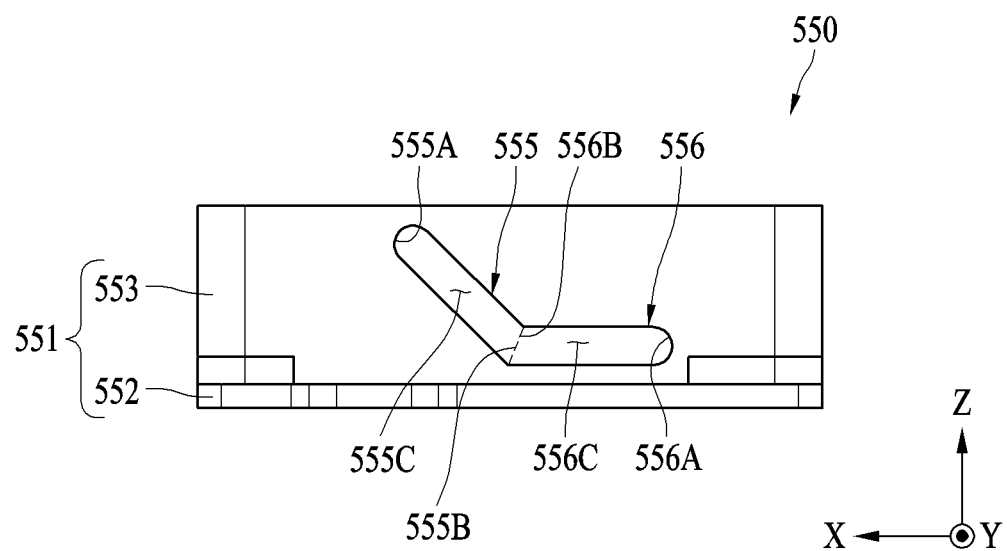
FIG. 22 is a side view illustrating a moving body according to an embodiment.

FIG. 22 is a side view illustrating a moving body according to an embodiment.

Referring to FIG. 22, a first moving body 550 may include a first moving body 551. The first moving body 551 may include a first part 552 and a second part 553.

The second part 553 may include a first guide rail 555 and a second guide rail 556. The first guide rail 555 may include a first edge 555A, a second edge 555B, and a first slot 555C. The second guide rail 556 may include a third edge 556A, a fourth edge 556B, and a second slot 556C.

The length of the first slot 555C may be substantially the same as the length of the second slot 556C. A maximum open angle formed by a first housing 410 and a second housing 420 of an electronic device 401 may be adjusted by adjusting a ratio of the length of the first slot 555C to the length of the second slot 556C.

Figure 23:
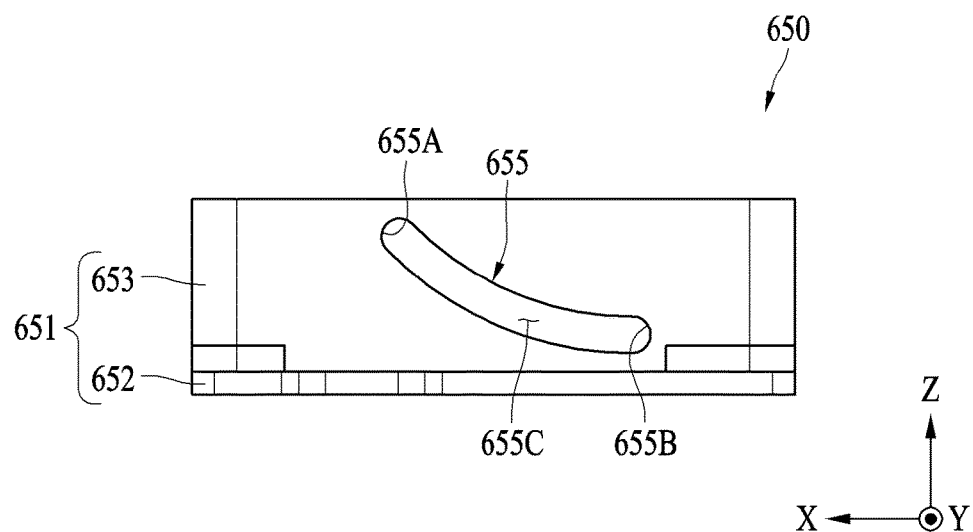
FIG. 23 is a side view illustrating a moving body according to an embodiment.

FIG. 23 is a side view illustrating a moving body according to an embodiment.

Referring to FIG. 23, a first moving body 650 may include a first moving body 651. The first moving body 651 may include a first part 652 and a second part 653. The second part 653 may include a guide rail 655.

The guide rail 655 may include a first edge 655A, a second edge 655B, and a slot 655C. The slot 655C may have a non-linear shape with at least a partially curved profile. For example, the slot 655C may generally have a curved shape. The slot 655C in the non-linear shape may increase a moving distance of an engaging portion (e.g., the engaging portion 363) and may increase the degree of freedom in designing a rotation angle of the second housing (e.g., the second housing 320) relative to the first housing (e.g., the first housing 310) and/or the shape of gears (e.g., the connecting gears 340A, 340B, 340C, 340D, and 340E and the driven gear 340F) of a gear assembly (e.g., the gear assembly 340).

Figure 24:
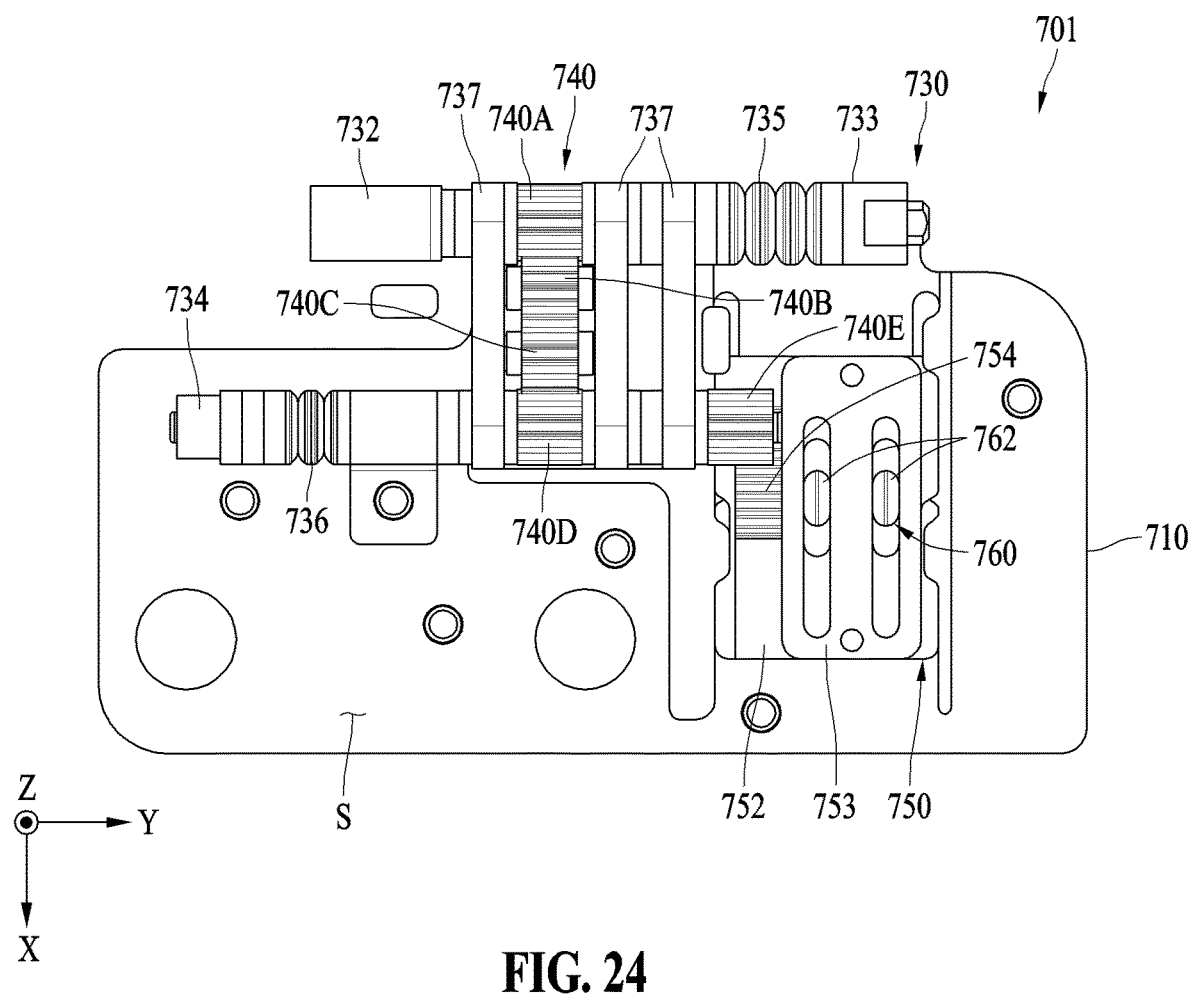
FIG. 24 is a plan view illustrating a lifting structure of an electronic device according to an embodiment.
Figure 25:
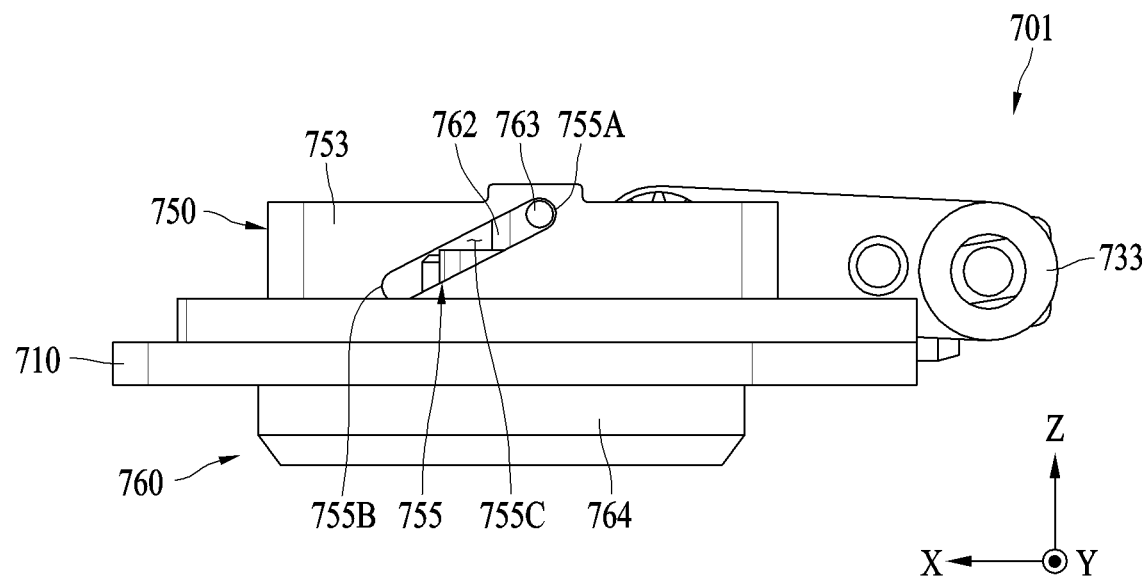
FIG. 25 is a side view illustrating a lifting structure of an electronic device according to an embodiment.

FIG. 24 is a plan view illustrating a lifting structure of an electronic device according to an embodiment. FIG. 25 is a side view illustrating a lifting structure of an electronic device according to an embodiment.

Referring to FIGS. 24 and 25, an electronic device 701 may include a first housing 710, a second housing, at least one (e.g., two) lifting structure 730, and a display.

The lifting structure 730 may include a fixing body 732, a first shaft 733, a second shaft 734, a first elastic body 735, a second elastic body 736, and at least one (e.g., three) link 737. The lifting structure 730 may have a gear assembly 740 including a plurality of gears, that is, first, second, third, and fourth connecting gears 740A, 740B, 740C, and 740D and a driven gear 740E.

The gear assembly 740 may include the first connecting gear 740A, the second connecting gear 740B, the third connecting gear 740C, and the fourth connecting gear 740D. The first connecting gear 740A is operably connected to the fixing body 732, the second connecting gear 740B is engaged with the first connecting gear 740A and configured to rotate in a rotational direction different from a rotational direction of the first connecting gear 740A, the third connecting gear 740C is engaged with the second connecting gear 740B and configured to rotate in a rotational direction different from the rotational direction of the second connecting gear 740B, and the fourth connecting gear 740D is engaged with the third connecting gear 740C and configured to rotate in a rotational direction different from the rotational direction of the third connecting gear 740C. The gear assembly 740 may include a decreased number of connecting gears, that is, the first, second, third, and fourth connecting gears 740A, 740B, 740C, and 740D, compared to the gear assembly described above, and accordingly, may have a decreased space for the lifting structure 730 in the first housing 710, and may secure a clearance space for accommodating other components.

The gear assembly 740 may include the driven gear 740E that is operably connected to the second shaft 734.

The lifting structure 730 may include a first moving body 750 and a second moving body 760. For example, while the first moving body 750 moves, in the first housing 710, in a direction (e.g., the −X-direction) from the second shaft 734 to the first shaft 733, the second moving body 760 may move in a direction (e.g., the −Z-direction) from one surface (e.g., the bottom surface) of the first housing 710 to a reference surface (e.g., the ground on which the electronic device 701 lies). As an example, while the first moving body 750 moves, in the first housing 710, in a direction (e.g., the +X-direction) from the first shaft 733 to the second shaft 734, the second moving body 760 may move in a direction (e.g., the +Z-direction) from the reference surface towards the surface (e.g., the bottom surface) of the first housing 710.

The first moving body 750 may include a first part 752 and a second part 753. The first part 752 may include a guide gear 754. The second part 753 may include at least one (e.g., two) guide rail 755 (FIG. 25). The guide rail 755 may include a first edge 755A, a second edge 755B, and a slot 755C.

The second moving body 760 may include a third part 762 and a fourth part 764. The third part 762 may include an engaging portion 763.

Figure 26:
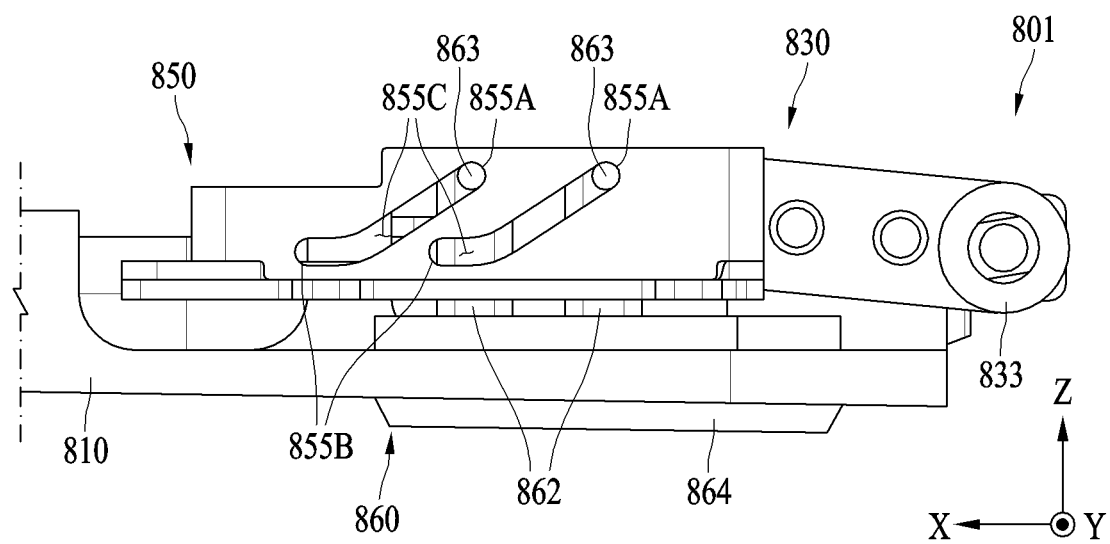
FIG. 26 is a side view illustrating a lifting structure of an electronic device according to an embodiment.
Figure 27:
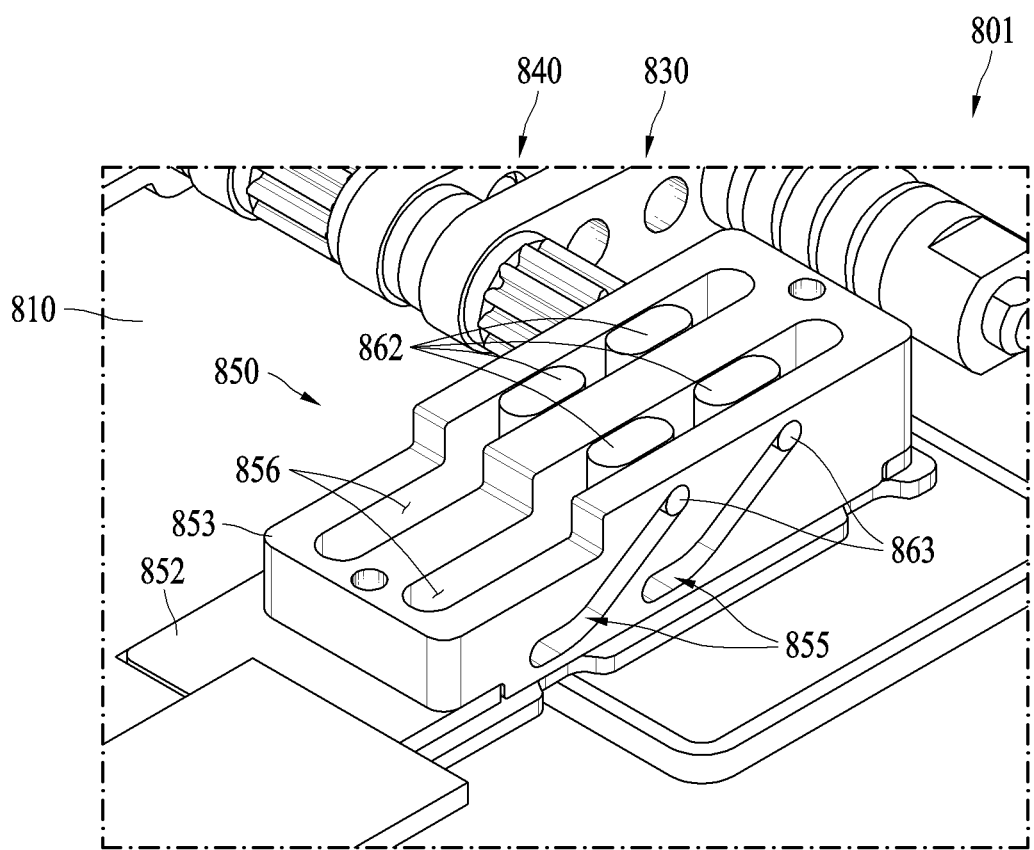
FIG. 27 is a perspective view illustrating a lifting structure of an electronic device according to an embodiment.

FIG. 26 is a side view illustrating a lifting structure of an electronic device according to an embodiment. FIG. 27 is a perspective view illustrating a lifting structure of an electronic device according to an embodiment.

Referring to FIGS. 26 and 27, an electronic device 801 may include a first housing 810, a second housing, at least one (e.g., two) lifting structure 830, and a display.

The lifting structure 830 may include a fixing body, a first shaft 833, a second shaft, a first elastic body, a second elastic body, and at least one (e.g., three) link.

The lifting structure 830 may include a gear assembly 840 including a plurality of gears (e.g., the first, second, third, fourth, and fifth connecting gears 340A, 340B, 340C, 340D, and/or 340E and the driven gear 340F).

The lifting structure 830 may include a first moving body 850 and a second moving body 860.

The first moving body 850 may include a first part 852 and a second part 853. The first part 852 may include a guide gear. The second part 853 may include a plurality of guide rails 855. The plurality of guide rails 855 are positioned in one surface (e.g., a side surface) of the second part 853 in one direction (e.g., the +/−X-direction). The plurality of guide rails 855 may each include a first edge 855A, a second edge 855B, and a slot 855C. The second part 853 may include at least one (e.g., two) additional guide rail 856 in one direction (e.g., the +/−X-direction) of the second part 853.

Figure 28:
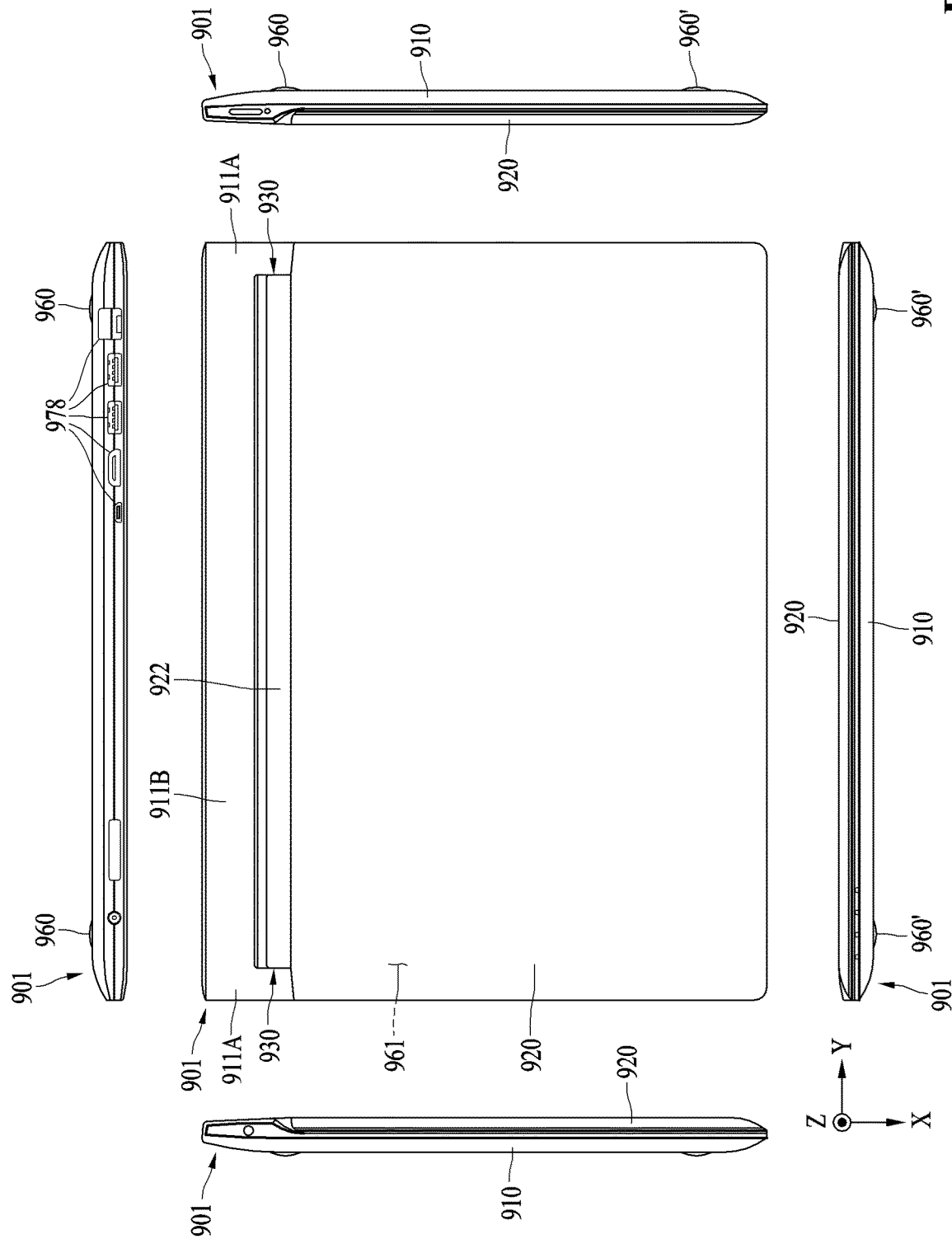
FIG. 28 is a diagram illustrating an electronic device in a closed state, according to an embodiment.
Figure 29:
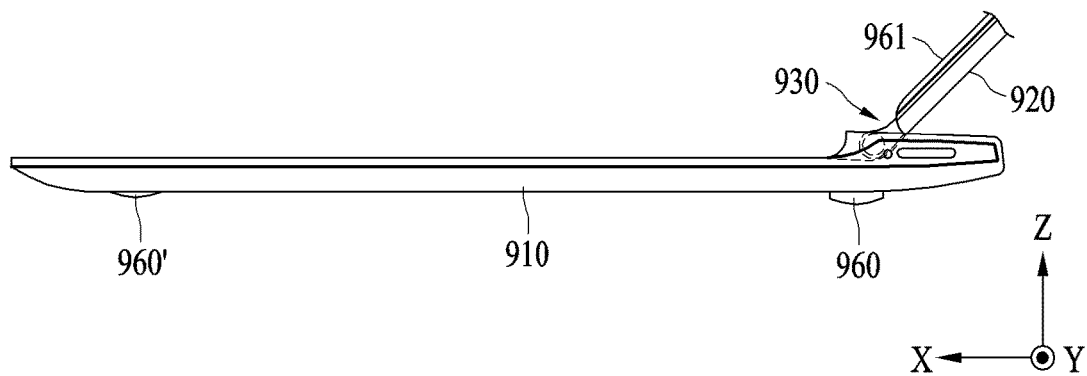
FIG. 29 is a diagram illustrating an electronic device in an open state, according to an embodiment.

The second moving body 860 may include a plurality of third parts 862 and a fourth part 864. The plurality of third parts 862 may each include an engaging portion 863 that is engaged with the plurality of first guide rails 855 and configured to move along the plurality of first guide rails 855, FIG. 28 is a diagram illustrating an electronic device in a closed state, according to an embodiment. FIG. 29 is a diagram illustrating an electronic device in an open state, according to an embodiment.

Referring to FIGS. 28 and 29, an electronic device 901 may include a first housing 910, a second housing 920, at least one (e.g., two) lifting structure 930, a moving body 960, a support foot 960', and a display 961.

The first housing 910 may include a plurality of first hinge couplers 911A and a connector 911B connecting the plurality of first hinge couplers 911A to one another. The lifting structure 930 may be positioned in one of the first hinge couplers 911A. At least one input terminal 978 (e.g., the connecting terminal 178 of FIG. 1) may be on one surface (e.g., the rear surface) of the connector 911B.

The second housing 920 may include a second hinge coupler 922 coupled to the plurality of first hinge couplers 911A, between the first hinge couplers 911A, and enclosed by the plurality of first hinge couplers 911A and the connector 911B, and the lifting structure 930 may be in the second hinge coupler 922.

The plurality of first hinge couplers 911A and the connector 911B may be in a rear space of the first housing 910 and may secure a space for accommodating the lifting structure 930. The lifting structure 930, through the moving body 960, may lift the first housing 910 away from a reference surface, and accordingly, may provide a user with a use angle (e.g., a typing angle) of the electronic device 901 and allow air to flow into a space between the reference surface and one surface (e.g., the bottom surface) of the first housing 910, thereby decreasing heat retention of the electronic device 901.

Figure 30:
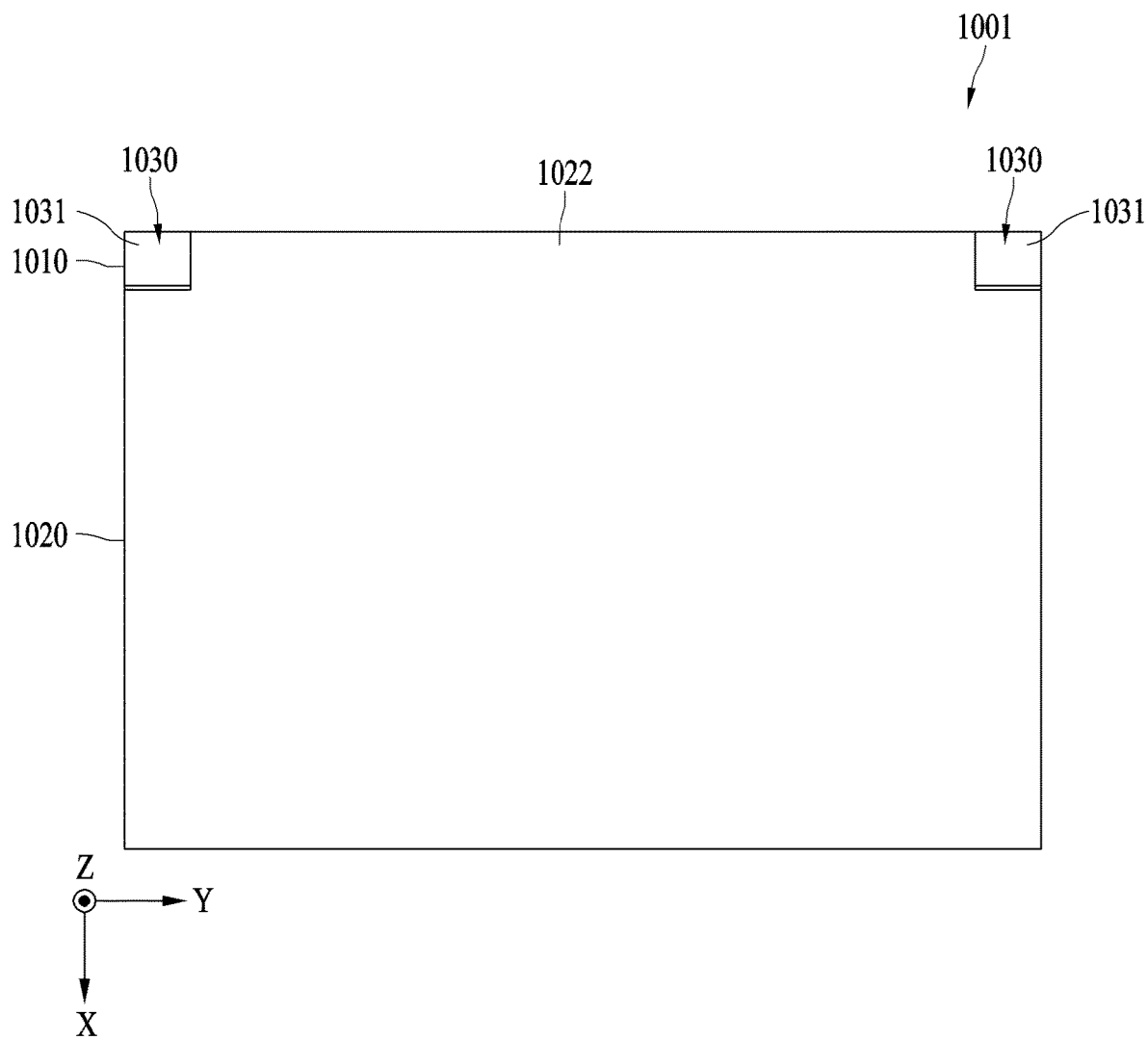
FIG. 30 is a plan view illustrating an electronic device in a closed state, according to an embodiment.
Figure 31:
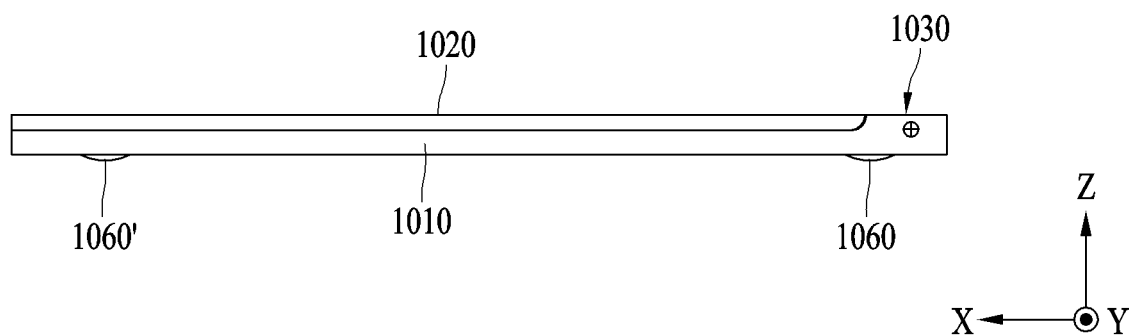
FIG. 31 is a side view illustrating an electronic device in a closed state, according to an embodiment.
Figure 32:
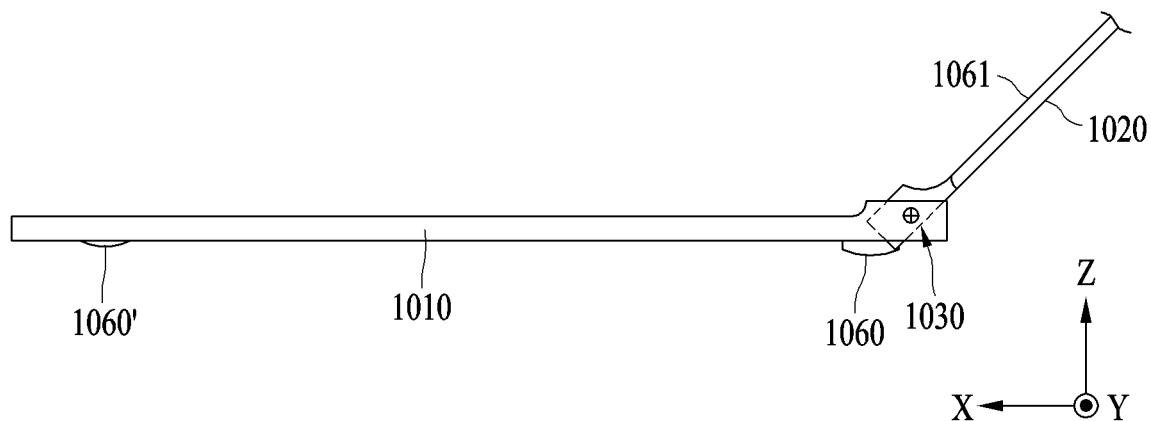
FIG. 32 is a side view illustrating an electronic device in an open state, according to an embodiment.

FIG. 30 is a plan view illustrating an electronic device in a closed state, according to an embodiment. FIG. 31 is a side view illustrating an electronic device in a closed state, according to an embodiment. FIG. 32 is a side view illustrating an electronic device in an open state, according to an embodiment.

Referring to FIGS. 30 to 32, an electronic device 1001 may include a first housing 1010, a second housing 1020, at least one (e.g., two) lifting structure 1030, a moving body 1060, a support foot 1060', and a display 1061.

The first housing 1010 may include a plurality of first hinge couplers 1031 (e.g., the first hinge couplers 911A) and the lifting structure 1030 may be in one of the first hinge couplers 1031.

The second housing 1020 may include a second hinge coupler 1022 engaged with the plurality of first hinge couplers 1031 and between the plurality of first hinge couplers 1031. The lifting structure 1030 may be in the second hinge coupler 1022.

Figure 33:
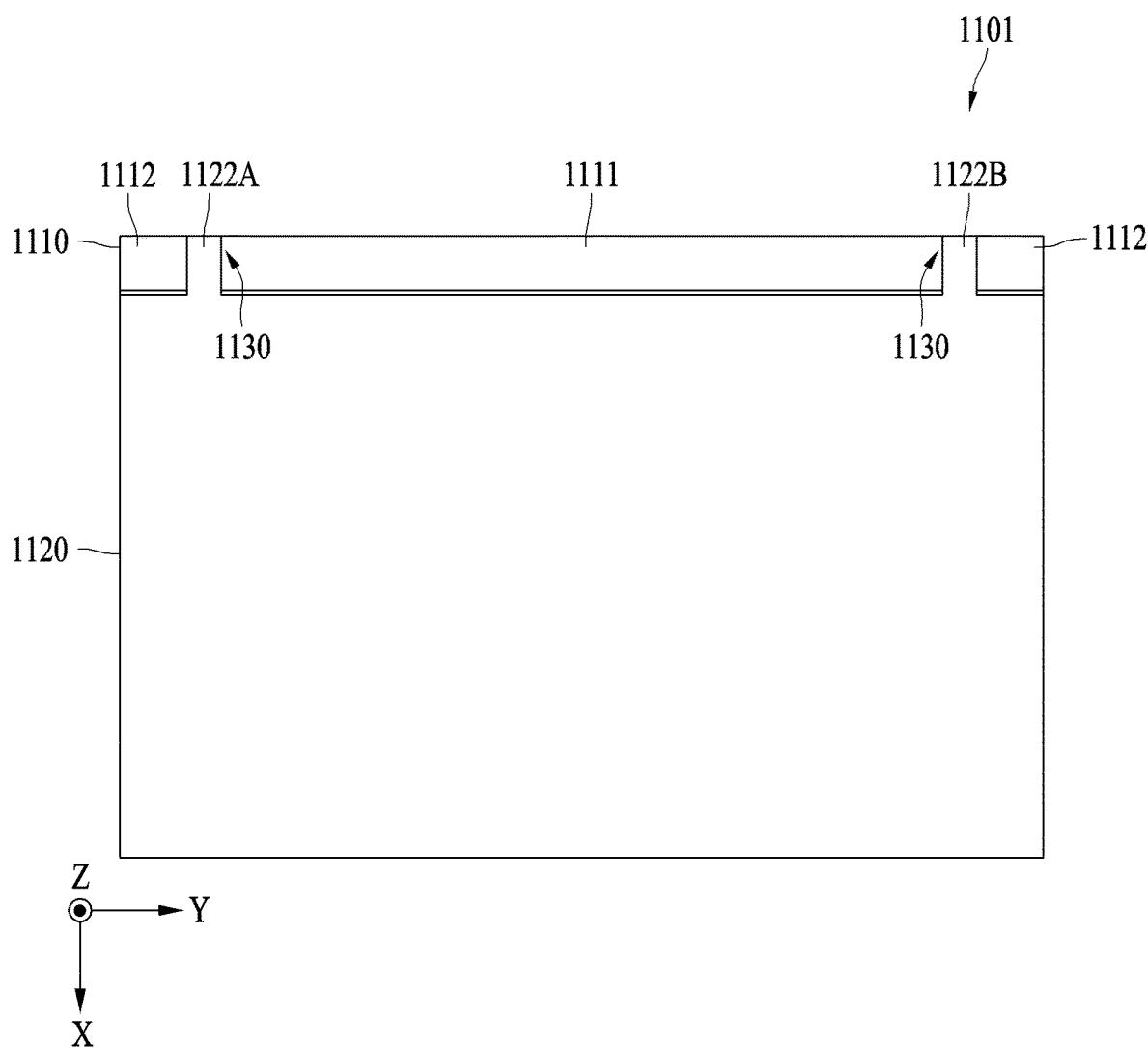
FIG. 33 is a plan view illustrating an electronic device according to an embodiment.

FIG. 33 is a plan view illustrating an electronic device according to an embodiment.

Referring to FIG. 33, an electronic device 1101 may include a first housing 1110, a second housing 1120, at least one (e.g., two) lifting structure 1130, a moving body, a support foot, and a display.

The first housing 1110 may include a first hinge coupler 1111 and a plurality of second hinge couplers 1112 that are spaced apart from and positioned on opposite sides of the first hinge coupler 1111.

The second housing 1120 may include a third hinge coupler 1122A and a fourth hinge coupler 1122B, in which the third hinge coupler 1122A is coupled to a first side (e.g., the left side in FIG. 33) of the first hinge coupler 1111 and one (e.g., the second hinge coupler 1112 on the left side) of the plurality of second hinge couplers 1112 and the fourth hinge coupler 1122B is coupled to a second side (e.g., the right side in FIG. 33) opposite to the first side of the first hinge coupler 1111 and one (e.g., the second hinge coupler 1112 on the right side) of the plurality of second hinge couplers 1112.

In an embodiment, at least one lifting structure 1130 may be in the first hinge coupler 1111 and/or one of the second hinge couplers 1112.

A method is provided, in which as the thickness of a main body of an electronic device decreases, a support structure may further protrude or an additional support structure may be added to the main body, such that a display may not touch the ground. An aspect of the disclosure provides a lifting structure that reduces damage to the display while reducing any appearance change of the electronic device in its open state.

According to an embodiment, an electronic device includes a first housing, a second housing including a display, and a lifting structure configured to connect the first housing to the second housing, rotate the second housing on the first housing, and lift the first housing, in which the lifting structure includes a fixing body fixed in the second housing, a gear assembly including at least one connecting gear connected to the fixing body and a driven gear operably connected to the at least one connecting gear, a first moving body configured to move, in the first housing, in a first direction and including a guide gear formed, in the first moving body, in the first direction and engaged with the driven gear and a first guide rail formed, in the first moving body, in a second direction intersecting with the first direction, and a second moving body configured to move, on the first housing, in a third direction intersecting with both the first and second directions and to support the first housing and including an engaging portion engaged with the first guide rail. The second direction may be an oblique direction on the first housing.

The first guide rail may include a first edge, a second edge that is opposite to the first edge, and a slot extending between the first edge and the second edge.

The engaging portion may be at the first edge of the first guide rail in a closed state of the electronic device in which the first housing and the second housing are folded and form a first angle and is at the second edge of the first guide rail in an open state of the electronic device in which the first housing and the second housing are folded and form a second angle that is greater than the first angle.

The at least one connecting gear may include at least one first connecting gear configured to rotate in a first rotational direction and at least one second connecting gear configured to rotate in a second rotational direction that is opposite to the first rotational direction.

The first moving body may include a first part including the guide gear and a second part separably coupled to the first part and including the first guide rail.

The first moving body may include a plurality of first guide rails, and the second moving body may include a plurality of engaging portions respectively engaged with the plurality of first guide rails.

The second moving body may include a third part including the engaging portion and a fourth part connected to the third part and configured to support the third part.

The electronic device may further include a supporter in the first housing and configured to support the first moving body and guide the second moving body.

The lifting structure may further include a first shaft connecting the fixing body to the at least one connecting gear and a second shaft fixed in the first housing and connecting the at least one connecting gear to the driven gear.

The lifting structure may further include a link connecting the first shaft to the second shaft.

The lifting structure may further include a first elastic body configured to enclose the first shaft and elastically support the at least one connecting gear and a second elastic body configured to enclose the second shaft and elastically support the at least one connecting gear and/or the driven gear.

The first moving body may further include a second guide rail connected to the first guide rail and formed, in the first moving body, in the first direction.

The length of the first guide rail may be greater than the length of the second guide rail.

The first guide rail may include at least some of a curved profile.

According to an embodiment, a lifting structure includes a fixing body, a gear assembly including at least one connecting gear connected to the fixing body and a driven gear operably connected to the at least one connecting gear, a first moving body configured to move in a first direction and including a guide gear formed, in the first moving body, in the first direction and engaged with the driven gear and a first guide rail formed, in the first moving body, in a second direction intersecting with the first direction, and a second moving body configured to move in a third direction intersecting with both the first and second directions and including an engaging portion engaged with the first guide rail.

The first moving body may further include a second guide rail connected to the first guide rail and formed, in the first moving body, in the first direction.

The length of the first guide rail may be greater than the length of the second guide rail.

The first guide rail may include at least some of a curved profile.

According to an embodiment, a method of operating an electronic device includes rotating a second housing, which includes a display, on a first housing, a plurality of gears operably connected to the second housing engaged with one another and rotating, a first moving body engaged with one of the plurality of gears moving, in the first housing, in a first direction, and a second moving body moving in a third direction intersecting with each of the first direction and a second direction, in which the second moving body includes an engaging portion moving, along a first guide rail of the first moving body, in the second direction intersecting with the first direction.

According to an embodiment, a rotating radius of the display may be secured. According to an embodiment, thermal efficiency of the electronic device may increase. According to an embodiment, the effects of the lifting structure and the electronic device including the lifting structure may not be limited to the above-mentioned effects, and other unmentioned effects may be clearly understood by one of ordinary skill in the art.

Features and aspects of the above described embodiments can be combined unless their combining results in evident technical conflicts. While the disclosure has been particularly shown and described with reference to certain embodiments thereof, it will be understood by those of ordinary skill in the art that various changes in form and details may be made therein without departing from the scope of the disclosure as defined by the following claims and their equivalents.

What is claimed is:

1. An electronic device comprising:
a first housing;
a second housing; and
a lifting structure configured to connect the first housing to the second housing and configured to lift the first housing based on rotation of the second housing,
wherein the lifting structure comprises:
a fixing body connected to the second housing;
a gear assembly comprising at least one connecting gear and a driven gear, wherein the driven gear is operably connected to the at least one connecting gear, and the at least one connecting gear is connected to the fixing body;
a first moving body configured to move, in the first housing, in a first direction, wherein the first moving body comprises a guide gear and a first guide rail formed in the first moving body in a second direction intersecting with the first direction, wherein the guide gear is formed on the first moving body, and wherein the guide gear extends in the first direction and is configured to be driven by the driven gear; and
a second moving body moveably coupled with the first housing and comprising an engaging portion configured to engage with the first guide rail, wherein the second moving body is configured to move in a third direction intersecting with the first direction and the second direction, and wherein the second moving body is configured to support the first housing,
wherein the first guide rail comprises a first edge, a second edge that is opposite to the first edge, and a slot extending between the first edge and the second edge,
wherein, when the electronic device is in a closed state, the engaging portion is positioned at the first edge of the first guide rail, and
wherein, when the electronic device is in an open state, the engaging portion is positioned at the second edge of the first guide rail.

2. The electronic device of claim 1, wherein the slot extends in a direction oblique to the first direction and the second direction.

3. The electronic device of claim 1, wherein the at least one connecting gear comprises:
at least one first connecting gear configured to rotate in a first rotational direction; and
at least one second connecting gear configured to rotate in a second rotational direction that is opposite to the first rotational direction.

4. The electronic device of claim 1, wherein the second housing comprises a display.

5. The electronic device of claim 1, wherein the first moving body further comprises a plurality of first guide rails, and
wherein the second moving body further comprises a plurality of engaging portions respectively engaged with the plurality of first guide rails.

6. The electronic device of claim 1, wherein the second moving body comprises:
a foot part connected to the engaging portion and configured to support the engaging portion against a surface on which the electronic device is placed.

7. The electronic device of claim 1, further comprising:
at least one supporter positioned in the first housing, configured to support the first moving body and guide the second moving body.

8. The electronic device of claim 1, wherein the lifting structure further comprises:
a first shaft connecting the fixing body to the at least one connecting gear, and
a second shaft fixed in the first housing and connecting the at least one connecting gear to the driven gear.

9. The electronic device of claim 8, wherein the lifting structure further comprises at least one link connecting the first shaft to the second shaft.

10. The electronic device of claim 1, wherein the first moving body further comprises a second guide rail connected to the first guide rail and formed, in the first moving body, in the first direction.

11. The electronic device of claim 10, wherein a length of the first guide rail is greater than a length of the second guide rail.

12. The electronic device of claim 1, wherein at least a part of the first guide rail comprises a curved profile.

13. An electronic device comprising:
a first housing:
a second housing; and
a lifting structure configured to connect the first housing to the second housing and configured to lift the first housing based on rotation of the second housing,
wherein the lifting structure comprises:
a fixing body connected to the second housing;
a gear assembly comprising at least one connecting gear and a driven gear, wherein the driven gear is operably connected to the at least one connecting gear, and the at least one connecting gear is connected to the fixing body;
a first moving body configured to move, in the first housing, in a first direction, wherein the first moving body comprises a guide gear and a first guide rail formed in the first moving body in a second direction intersecting with the first direction, wherein the guide gear is formed on the first moving body, and wherein the guide gear extends in the first direction and is configured to be driven by the driven gear;
a second moving body moveably coupled with the first housing and comprising an engaging portion configured to engage with the first guide rail, wherein the second moving body is configured to move in a third direction intersecting with the first direction and the second direction, and wherein the second moving body is configured to support the first housing;

a first shaft connecting the fixing body to the at least one connecting gear;
a second shaft fixed in the first housing and connecting the at least one connecting gear to the driven gear;
a first elastic body configured to enclose the first shaft and elastically support the at least one connecting gear; and
a second elastic body configured to enclose the second shaft and elastically support the at least one of the connecting gear or the driven gear.

\* \* \* \* \*